（12）United States Patent
Sakamoto

(10) Patent No.: US 10,003,821 B2
(45) Date of Patent: Jun. 19, 2018

(54) IMAGE ENCODING APPARATUS AND METHOD OF CONTROLLING SAME

(71) Applicant: CANON KABUSHIKI KAISHA, Tokyo (JP)

(72) Inventor: Daisuke Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 15/299,073

(22) Filed: Oct. 20, 2016

(65) Prior Publication Data
US 2017/0118492 A1 Apr. 27, 2017

(30) Foreign Application Priority Data

Oct. 27, 2015 (JP) .................................. 2015-211107
Aug. 25, 2016 (JP) .................................. 2016-165074

(51) Int. Cl.
| | | |
|---|---|---|
| *H04N 19/00* | (2014.01) | |
| *H04N 19/63* | (2014.01) | |
| *H04N 19/18* | (2014.01) | |
| *H04N 19/182* | (2014.01) | |
| *H04N 19/176* | (2014.01) | |
| *H04N 19/115* | (2014.01) | |

(52) U.S. Cl.
CPC .......... *H04N 19/63* (2014.11); *H04N 19/115* (2014.11); *H04N 19/176* (2014.11); *H04N 19/18* (2014.11); *H04N 19/182* (2014.11)

(58) Field of Classification Search
CPC .... H04N 19/63; H04N 19/115; H04N 19/176; H04N 19/18; H04N 19/182
See application file for complete search history.

(56) References Cited

U.S. PATENT DOCUMENTS

| | | | |
|---|---|---|---|
| 6,549,666 B1* | 4/2003 | Schwartz | G06F 17/148 375/E7.016 |
| 8,363,717 B2 | 1/2013 | Togita et al. | 375/240.03 |
| 9,204,170 B2* | 12/2015 | Smith | H04N 19/176 |
| 2002/0057276 A1* | 5/2002 | Osa | G06F 13/28 345/555 |
| 2005/0276328 A1 | 12/2005 | Sakamoto | 375/240.16 |
| 2009/0046941 A1* | 2/2009 | Mietens | H04N 19/176 382/250 |

(Continued)

FOREIGN PATENT DOCUMENTS

| | | |
|---|---|---|
| JP | 2004-056213 | 2/2004 |
| JP | 2007-142615 | 6/2007 |

*Primary Examiner* — Ping Hsieh
(74) *Attorney, Agent, or Firm* — Fitzpatrick, Cella, Harper & Scinto

(57) ABSTRACT

To suppress image degradation of a tile boundary while suppressing an increase of an amount of encoded data due to tile division. When performing a wavelet transform on a tile of interest, a wavelet transform unit performs a wavelet transform by referring to pixel data of the tile of interest and a neighboring tile that neighbors the tile of interest to obtain transformation coefficient data of a set resolution level. From transformation coefficient data obtained from the neighboring tile, the wavelet transform unit supplies a subsequent quantizing unit with transformation coefficient data of each resolution level that is closest to a boundary between the tile of interest and the neighboring tile, as well as all transformation coefficient data obtained from the tile of interest.

16 Claims, 18 Drawing Sheets

(56) References Cited

U.S. PATENT DOCUMENTS

| | | | |
|---|---|---|---|
| 2013/0177074 A1 | 1/2013 | Togita et al. | 375/240.03 |
| 2014/0044164 A1* | 2/2014 | Gu | H04N 19/176 375/240.03 |
| 2015/0156517 A1* | 6/2015 | Lu | H04N 1/413 375/240.18 |
| 2015/0201209 A1 | 7/2015 | Sakamoto | 375/240.16 |

* cited by examiner

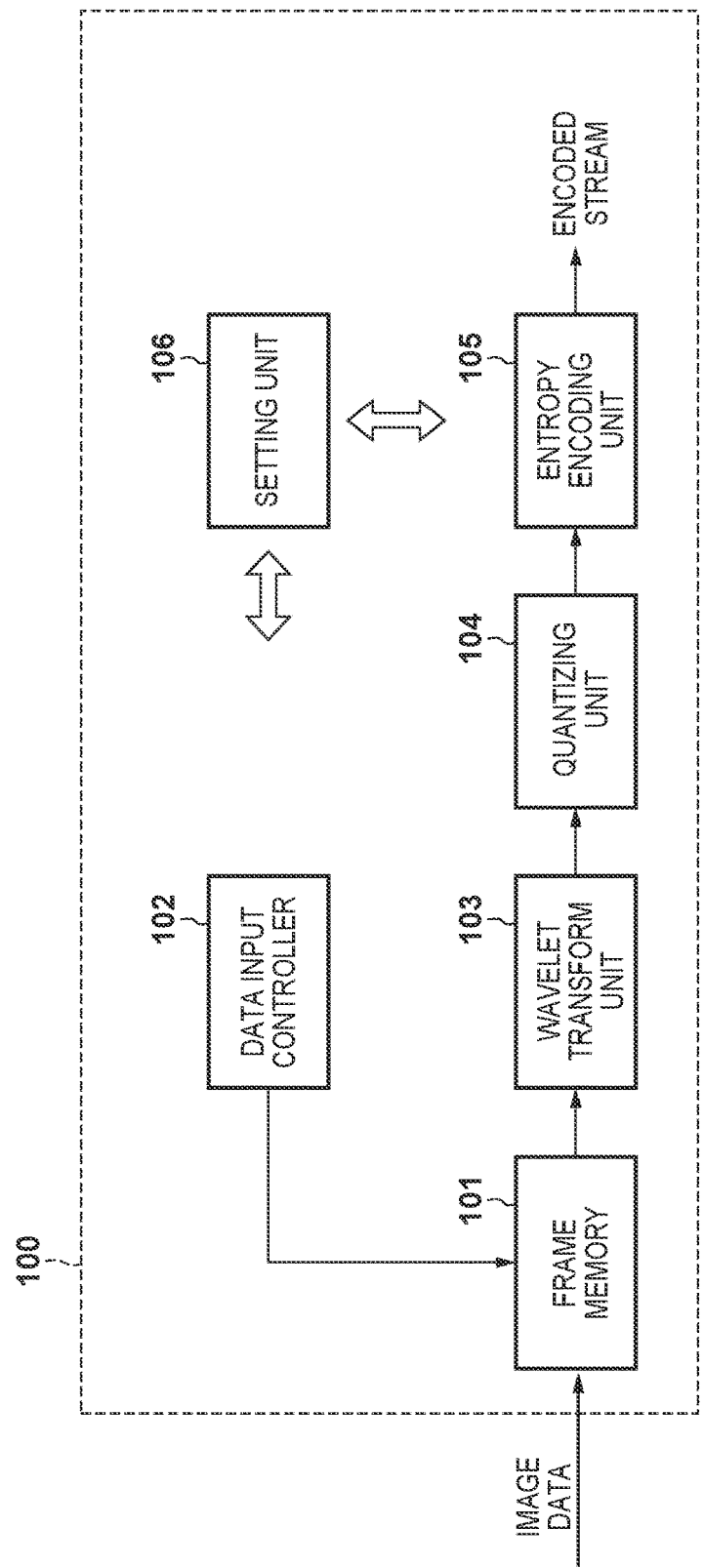

FIG. 10A

IF POSITION OF NEIGHBORING TILE IS ABOVE OR TO THE LEFT

| NUMBER OF WAVELET TRANSFORMS | REMAINDER OF WIDTH OF TILE OF INTEREST / 8 | NUMBER OF PIXELS OVERLAPPING FROM NEIGHBORING TILE TO INPUT | NUMBER OF PIECES OF TRANSFORMATION COEFFICIENT DATA NECESSARY FOR DECODING OF TILE OF INTEREST FROM TRANSFORMATION COEFFICIENT DATA OF NEIGHBORING TILE | | | | | |
|---|---|---|---|---|---|---|---|---|
| | | | 1H | 1L | 2H | 2L | 3H | 3L |
| 1 | 0,1,2,3,4,5,6,7 | 2 | 1 | 0 | | | | |
| 2 | 0,1,2,3,4,5,6,7 | 8 | 1 | | 1 | 0 | | |
| 3 | 0,1,2,3,4,5,6,7 | 16 | 1 | | 1 | | 1 | 0 |

IF POSITION OF NEIGHBORING TILE IS BELOW OR TO THE RIGHT

FIG. 10B

| NUMBER OF WAVELET TRANSFORMS | REMAINDER OF WIDTH OF TILE OF INTEREST / 8 | NUMBER OF OVERLAPPING PIXELS | \multicolumn{6}{c}{NUMBER OF PIECES OF TRANSFORMATION COEFFICIENT DATA NECESSARY FOR DECODING OF TILE OF INTEREST FROM TRANSFORMATION COEFFICIENT DATA OF NEIGHBORING TILE} | | | | | |
|---|---|---|---|---|---|---|---|---|
| | | | 1H | 1L | 2H | 2L | 3H | 3L |
| 1 | 0 | 3 | 1 | 1 | | | | |
| 1 | 1 | 2 | 1 | 0 | | | | |
| 1 | 2 | 3 | 1 | 1 | | | | |
| 1 | 3 | 2 | 1 | 0 | | | | |
| 1 | 4 | 3 | 1 | 1 | | | | |
| 1 | 5 | 2 | 1 | 0 | | | | |
| 1 | 6 | 3 | 1 | 1 | | | | |
| 1 | 7 | 2 | 1 | 0 | | | | |
| 2 | 0 | 7 | 1 | | 1 | 1 | | |
| 2 | 1 | 6 | 1 | | 1 | 0 | | |
| 2 | 2 | 9 | 1 | | 2 | 1 | | |
| 2 | 3 | 8 | 1 | | 1 | 1 | | |
| 2 | 4 | 7 | 1 | | 1 | 1 | | |
| 2 | 5 | 6 | 1 | | 1 | 0 | | |
| 2 | 6 | 9 | 1 | | 2 | 1 | | |
| 2 | 7 | 8 | 1 | | 1 | 1 | | |
| 3 | 0 | 15 | 1 | | 1 | | 1 | 1 |
| 3 | 1 | 14 | 1 | | 1 | | 1 | 0 |
| 3 | 2 | 21 | 1 | | 2 | | 2 | 1 |
| 3 | 3 | 20 | 1 | | 1 | | 2 | 1 |
| 3 | 4 | 19 | 1 | | 1 | | 2 | 1 |
| 3 | 5 | 18 | 1 | | 1 | | 1 | 1 |
| 3 | 6 | 17 | 1 | | 2 | | 1 | 1 |
| 3 | 7 | 16 | 1 | | 1 | | 1 | 1 |

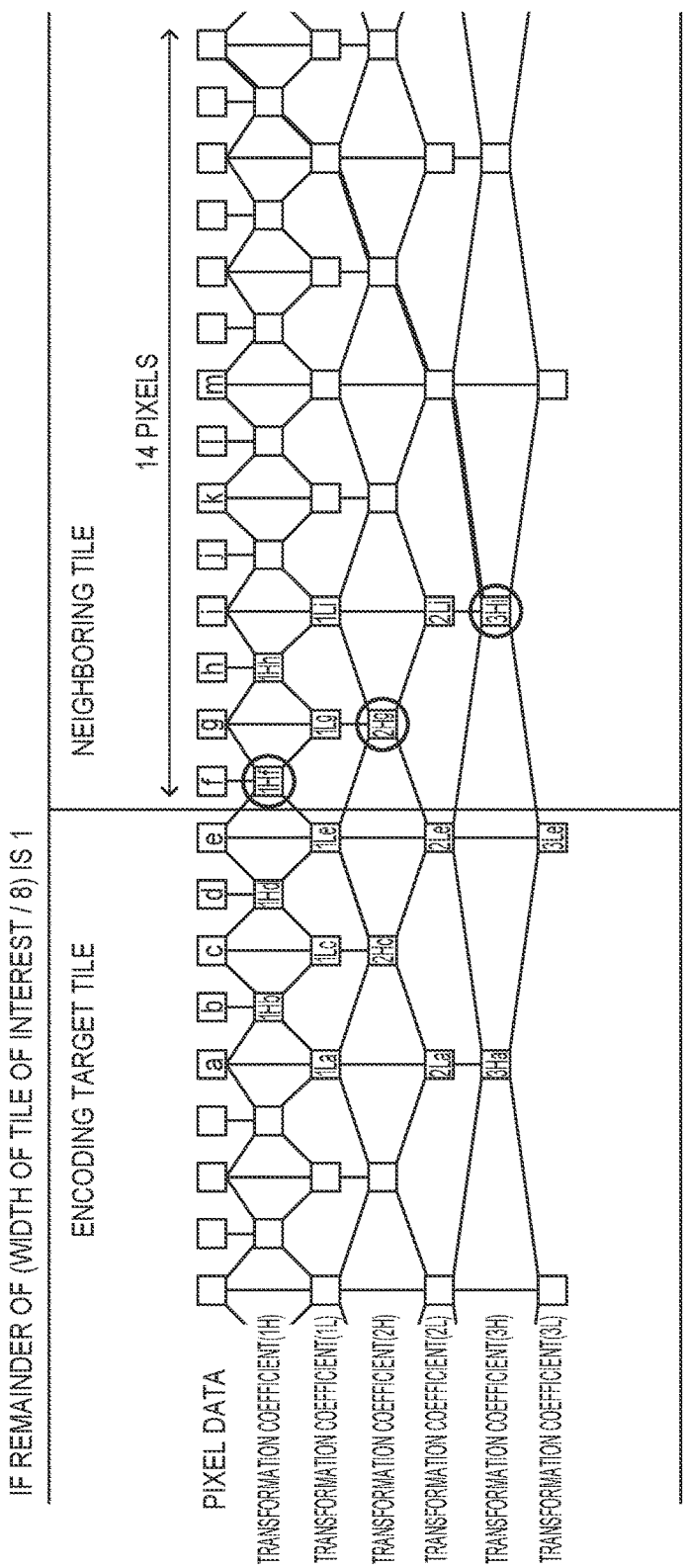

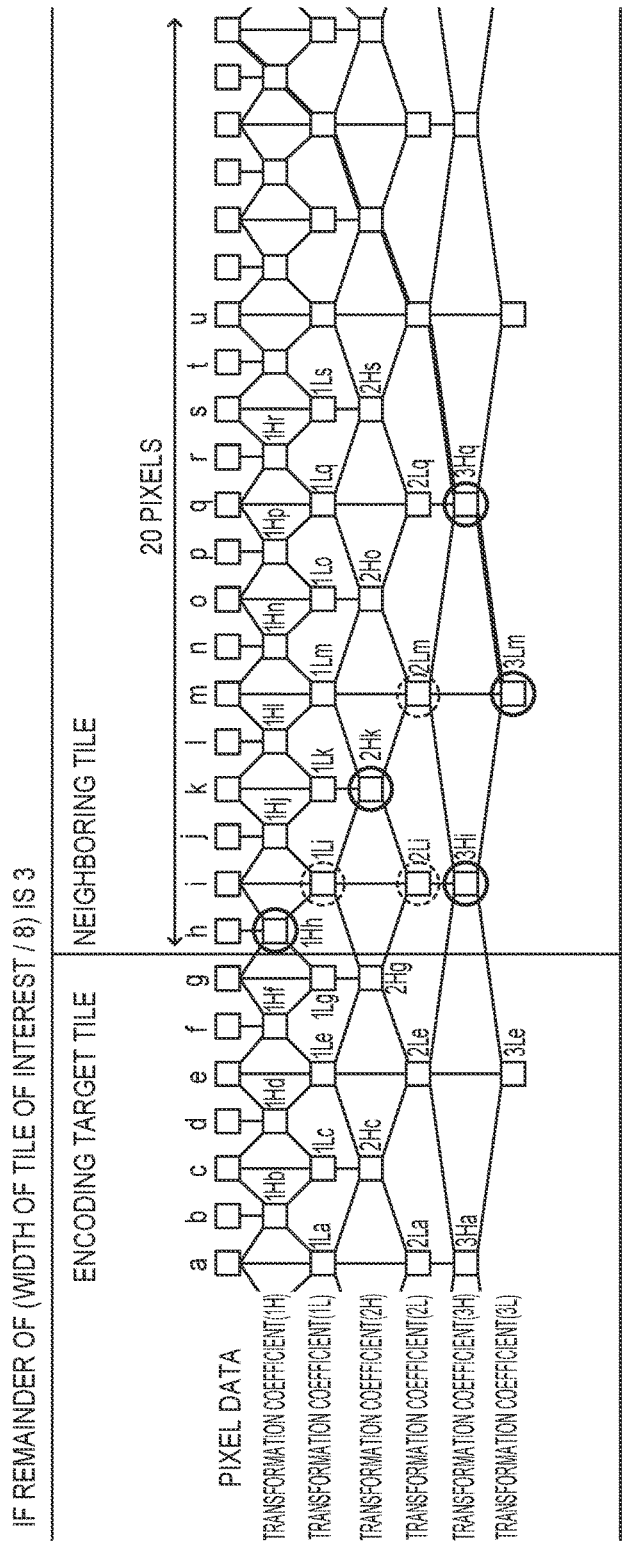

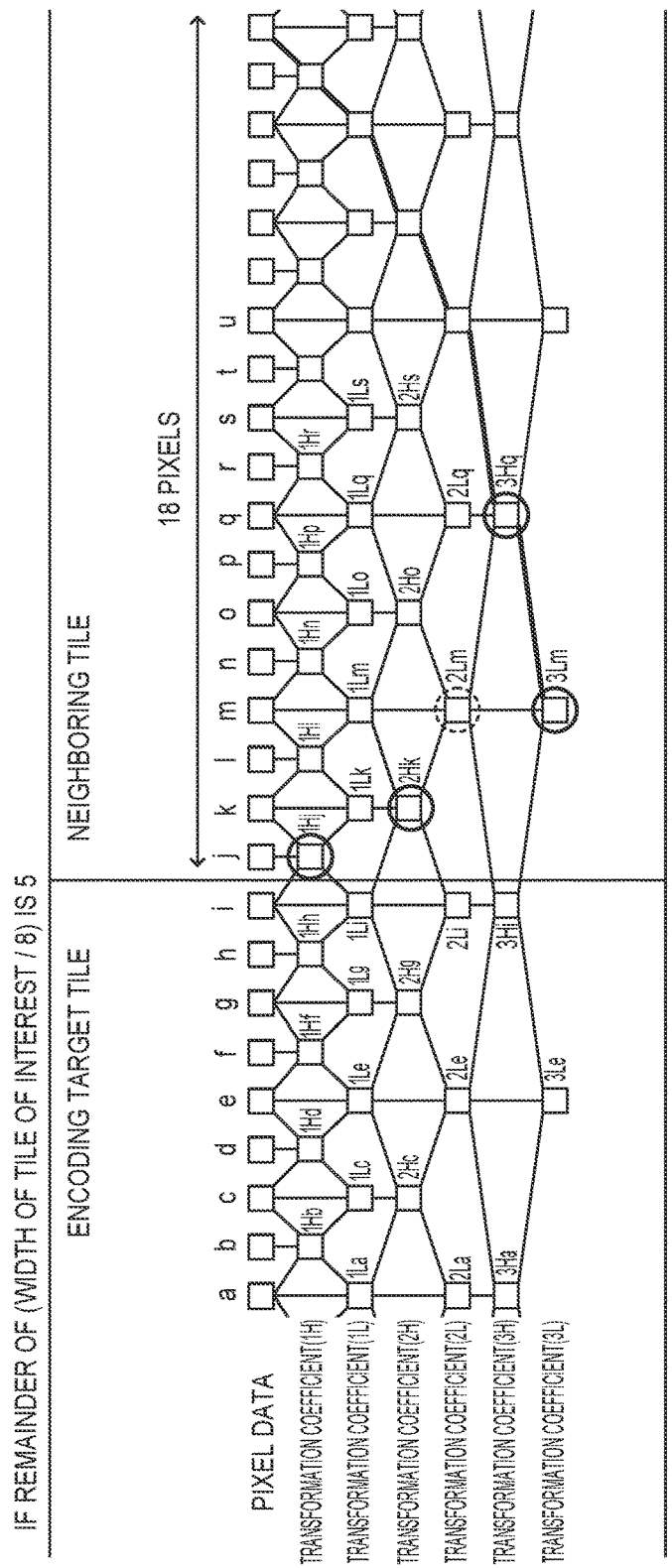

IMAGE ENCODING APPARATUS AND METHOD OF CONTROLLING SAME

BACKGROUND OF THE INVENTION

Field of the Invention

The present invention relates to an encoding technique for image data.

Description of the Related Art

In recent years, various compression encoding methods for image data have been examined in conjunction with the development of digital image capturing apparatuses such as digital cameras and digital video cameras.

JPEG (Joint Photograph Experts Group) 2000 is given as a representative compression encoding method. In JPEG 2000, an image that is an encoding target is divided into at least one or more tiles. A wavelet transform, quantization, and entropy encoding are performed with a tile as one unit. A lossless 5/3 tap filter, for example, is used in a wavelet transform. In this filter, one high-pass coefficient is generated from three consecutive pixels, and one low-pass coefficient is generated from five consecutive pixels. Consequently, when subjecting pixels at a boundary of the tile to filter processing, pixels outside of the tile are required. A proposal to substitute pixels inside the tile for pixels outside the tile is known (for example, Japanese Patent Laid-Open No. 2007-142615; hereinafter, D1). D1 sets a position of a pixel at a boundary of the tile of interest as a fold position, and uses coefficient data and a pixel in the tile as the coefficient data and the pixel for outside the tile.

However, it is not that a pixel or coefficient data actually present outside of a tile of interest is referred to for the filtering processing. Therefore, a difference occurs between coefficient data after quantization of the tile boundary and coefficient data in a case of referring to a pixel that is actually outside of the tile. This difference means that continuity is lost for tiles in an image obtained by decoding, and consequently noise occurs at tile boundaries.

With respect to this problem, Japanese Patent Laid-Open No. 2004-56213 (hereinafter, D2) discloses a technique of, when encoding a tile of interest, performing encoding processing that includes pixels inside a tile that neighbors the tile of interest. According to D2, in decoding processing of a tile of interest, pixels of the tile of interest and pixels neighboring the boundary with the neighboring tile are obtained. Therefore, a result of removing pixels for the neighboring tile is assumed to be an image that is a decoding result of the tile of interest. According to D2, it is possible to suppress generation of noise at tile boundaries because continuity for adjacent tiles is maintained.

However, although the above described D2 can suppress image degradation, when encoding a tile of interest there is a necessity to perform encoding that includes pixels for the neighboring tile. Therefore, an encoding data amount generated by D2 becomes large in comparison to D1 to a degree that it cannot be ignored. In other words, to cause the amount of encoded data to be equivalent to that of D1 by using the technique of D2, the quantization step in D2 must be larger than that of D1. However, the larger a quantization step is the larger that image degradation becomes.

SUMMARY OF THE INVENTION

The present invention is something conceived in view of these points, and provides a technique that enables maintaining continuity of tiles upon tile division, and achieving an amount of encoded data generated that is much less than that of D2.

According to an aspect of the invention, there is provided an image encoding apparatus that divides image data into a plurality of tiles and performs encoding for each tile, the apparatus comprising: a transformation unit configured to perform, for each tile, a wavelet transform and obtain transformation coefficient data; and an encoding unit configured to encode, for each tile, the transformation coefficient data obtained by the transformation unit, wherein, if a neighboring tile that neighbors an encoding target tile is present, the transformation unit obtains the transformation coefficient data by performing the wavelet transform with reference to pixel data of the encoding target tile and a plurality of pieces of pixel data that neighbor the encoding target tile out of the neighboring tile, and the encoding unit, out of the transformation coefficient data obtained by referring to the plurality of pieces of pixel data of the neighboring tile, encodes at least transformation coefficient data necessary to decode the pixel data of the encoding target tile, and does not encode a portion of the transformation coefficient data obtained by the transformation unit.

According to the present invention, it is possible to suppress image degradation of a tile boundary while suppressing an increase of an amount of encoded data due to tile division.

Further features of the present invention will become apparent from the following description of exemplary embodiments (with reference to the attached drawings).

BRIEF DESCRIPTION OF THE DRAWINGS

FIG. 1 is a block configuration diagram for an image encoding unit in a first embodiment.

FIGS. 10A-10B are views illustrating a relation among a number of pixels that overlap from a neighboring tile and are input, when a wavelet transform is performed three times.

FIGS. 11A-11H are views for explaining an execution method in a case of performing a wavelet transformation three times.

DESCRIPTION OF THE EMBODIMENTS

Figure 2A:
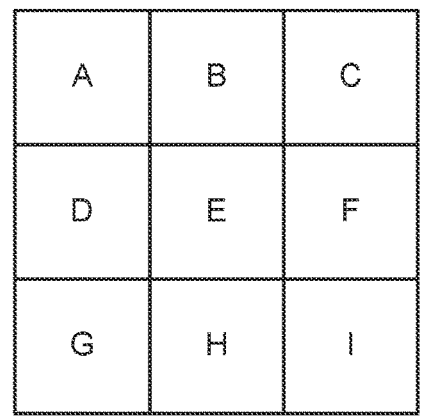
FIGS. 2A through 2C are views for explaining a tile input method in the first embodiment.

Hereinafter, embodiments according to the present invention will be explained in detail in accordance with the accompanying drawings. Note that the embodiments explained below illustrate an example of a case in which the present invention is specifically implemented in detail, and are each one specific embodiment of a configuration recited in the scope of the patent claims.

First Embodiment

Explanation is given of an example in which the first embodiment is applied to an image capturing apparatus such as a digital camera. FIG. 1 is a block configuration diagram of an image encoding unit 100 in an image capturing apparatus.

As shown in the figure, the image encoding unit 100 has a frame memory 101, a data input controller 102, a wavelet transform unit 103, a quantizing unit 104, an entropy encoding unit 105, and a setting unit 106. Note that, in the first embodiment, although explanation is given of an example of using JPEG 2000 as an example of an encoding scheme, the encoding scheme is not particularly questioned. Explanation is given below of a processing procedure for encoding processing based on the configuration of FIG. 1. Here, the setting unit 106 decides, in accordance with an instruction from an operation unit (not shown), how many tiles to divide image data that is an encoding target into, and furthermore how many times to perform a wavelet transform (what to set a number of decomposition levels to). The setting unit 106 then decides a size of one tile, as well as a number of overlapping pixels, and transformation coefficient data that is a quantization target, for which detail is explained later.

In the present embodiment, the number of divisions for tiles and the number of decomposition levels are assumed to be decided in accordance with an instruction from an operation unit, but configuration may be taken such that a system control unit (not shown) of the image capturing apparatus automatically decides based on a predetermined condition.

In addition, in the present embodiment, a tile indicates a divided image for when one frame image is divided into a plurality.

If there is a start instruction for recording from the operation unit (not shown), image data captured by an image capturing unit (not shown) is input and stored in the frame memory 101 in a capturing order. The data input controller 102 divides image data for one frame stored in the frame memory 101 into a plurality of tiles. The number of divisions for the tiles and the size of each tile depends on settings from the setting unit 106. Below, partial image data expressed by a divided tile is referred to as tile image data. The data input controller 102 supplies each piece of tile image data to the wavelet transform unit 103 in accordance with a predetermined order. Detail is explained later, but when supplying a certain piece of tile image data of interest to the wavelet transform unit 103, the data input controller 102 also supplies pixel data in neighboring tile image data that is positioned within a preset distance from a tile boundary in addition to the tile image data of interest. Below, the pixel data positioned within a preset distance from the tile boundary in the neighboring tile image data is referred to as tile neighboring pixel data. Because it is as described above, respective pieces of image data supplied to the wavelet transform unit 103 from the data input controller 102 overlap each other.

The wavelet transform unit 103 sends to the quantizing unit 104 transformation coefficient data achieved by executing a wavelet transform on the tile image data and the tile neighboring pixel data input from the frame memory 101. However, a detailed execution method for this wavelet transform is explained later.

The quantizing unit 104 uses a quantization parameter to quantize the transformation coefficient data sent from the wavelet transform unit 103, and sends a result to the entropy encoding unit 105. At this time, a quantization parameter to provide to the same subband among tile images is set to the same or a close value. By this it is possible to make image degradation among tile images uniform, and make image degradation at a tile boundary not stand out.

For each subband, the entropy encoding unit 105 performs entropy encoding on the transformation coefficient data after the quantization by the quantizing unit 104 and outputs encoded data. Entropy encoding such as EBCOT (Embedded Block Coding with Optimized Truncation) is applied as the entropy encoding, and the encoded data is outputted.

Figure 2B:
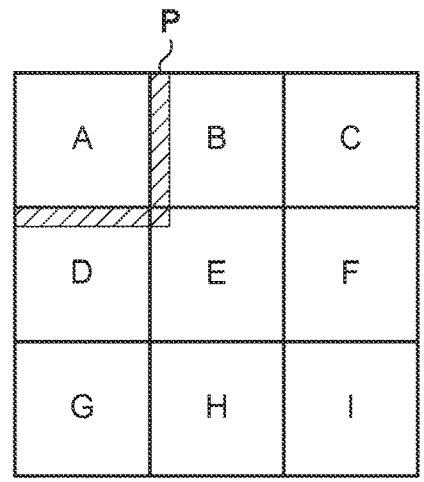
Figure 2C:
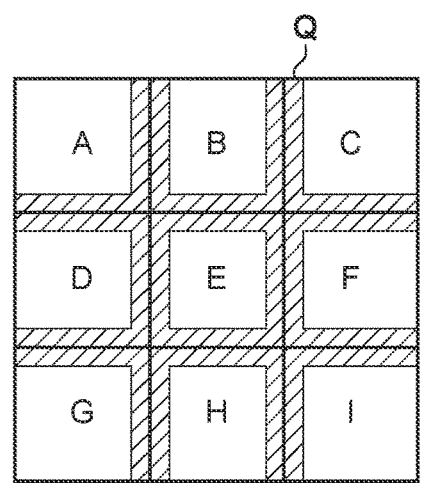

Next, FIGS. 2A-2C are used to explain a relation between the tile image data and the tile neighboring pixel data supplied to the wavelet transform unit 103.

FIG. 2A illustrates an example in which, by making three horizontal divisions and three vertical divisions for one frame of image data, nine pieces of tile image data A through I are generated from one frame. The data input controller 102 supplies the wavelet transform unit 103 in a raster scan order of tile image data A→B→C→D→ . . . →I that has a tile as a unit. In addition, as already explained, when supplying the wavelet transform unit 103 with one piece of tile image data, the data input controller 102 also supplies the wavelet transform unit 103 with the tile neighboring pixel data thereof.

Raising the tile image data A of FIG. 2B as an example, description is given here of the relation with tile neighboring pixel data. The tile image data A is positioned in the top-left of a frame image. Therefore, tile image data neighboring the tile image data A is the tile image data B, D, and E. Accordingly, when supplying the tile image data A to the wavelet transform unit 103, the data input controller 102 inputs as tile neighboring pixel data the pixel data of a portion indicated by hatching P of FIG. 2B to the wavelet transform unit 103. If the same concept is applied to all tiles of the tile image data A through I, the tile neighboring pixel data for each piece of tile image data is indicated by hatching Q of FIG. 2C. Note that a horizontal or vertical distance (a number of pixels) of tile neighboring pixel data P differs in accordance with a number of wavelet transforms, a size of tile image data of interest, and positions of neighboring tile images. In addition, the vertical and horizontal number of pixels for the tile neighboring pixel data P is called a number of overlapping pixels.

A relation between a number of overlapping pixels for when a wavelet transform is performed three times and a number of pieces of transformation coefficient data for a neighboring tile required to decode a pixel at an edge of a tile of interest is indicated in FIGS. 10A and 10B.

In FIGS. 10A and 10B, out of pieces of transformation coefficient data for the neighboring tile obtained upon performing a wavelet transform in which pixels of a neighboring tile have been added, a number of pieces of transformation coefficient data required when decoding a pixel of a tile of interest that is an encoding target is recorded for each sub-subband. In the present embodiment, if a wavelet transform is performed once, transformation coefficient data for subbands 1H and 1L are generated, and the transformation coefficient data of the subbands 1H and 1L is encoded. If a wavelet transform is performed two times, transformation coefficient data for subbands 1H, 1L, 2H, and 2L is generated, and the transformation coefficient data of the subbands 1H, 2H, and 2L is encoded. If a wavelet transform is performed three times, the transformation coefficient data for subbands 1H, 1L, 2H, 2L, 3H, and 3L is generated, and the transformation coefficient data for the subbands 1H, 2H, 3H, and 3L is encoded. Therefore, for a subband that is not generated or a subband for which encoding is not performed, a number of pieces of data is not stated and is made grey.

FIG. 10A illustrates, in the case where a neighboring tile is positioned above or to the left of a tile of interest, a relation among a number of wavelet transforms, a number of overlapping pixels, and a number of pieces of transformation coefficient data of the neighboring tile that are required to decode a pixel of a top edge or a left edge of the tile of interest.

In the present embodiment, a wavelet transform uses an integer type 5/3 tap filter. If performing a wavelet transform on one piece of tile image data, the transform is started after setting an upper left corner of the tile image data as a start position. Therefore, regardless of what size the tile image data of interest is, a fixed number of overlapping pixels according to a number of wavelet transforms are referred to from tile image data that neighbors above and to the left. As shown in the figure, if a wavelet transform is performed only once, the number of overlapping pixels for tile image data neighboring above or to the left becomes "2". In addition, the number of overlapping pixels with respect to a neighboring tile if a wavelet transform is performed twice becomes "8". In addition, the number of overlapping pixels with respect to a neighboring tile if a wavelet transform is performed three times becomes "16".

FIG. 10B illustrates, in the case where a neighboring tile is positioned below or to the right of a tile image of interest, a relation among a number of wavelet transforms, a number of overlapping pixels, and a number of pieces of transformation coefficient data of the neighboring tile that are required to decode a pixel of the tile of interest. If the neighboring tile image data is positioned below or to the right of tile image data of interest, the number of overlapping pixels becomes something that depends on the size of the tile image data of interest. More accurately, it depends on a remainder of dividing by "8" a number of pixels for the horizontal and vertical directions of the tile image data of interest. For example, a remainder of dividing by "8" a number of pixels for horizontal and vertical directions of the tile image data of interest is assumed to be 0. In such a case, if performing a wavelet transform only once, the number of overlapping pixels for tile image data neighboring below or to the right becomes "3". In addition, the number of overlapping pixels if a wavelet transform is performed three times becomes "15".

Figure 3:
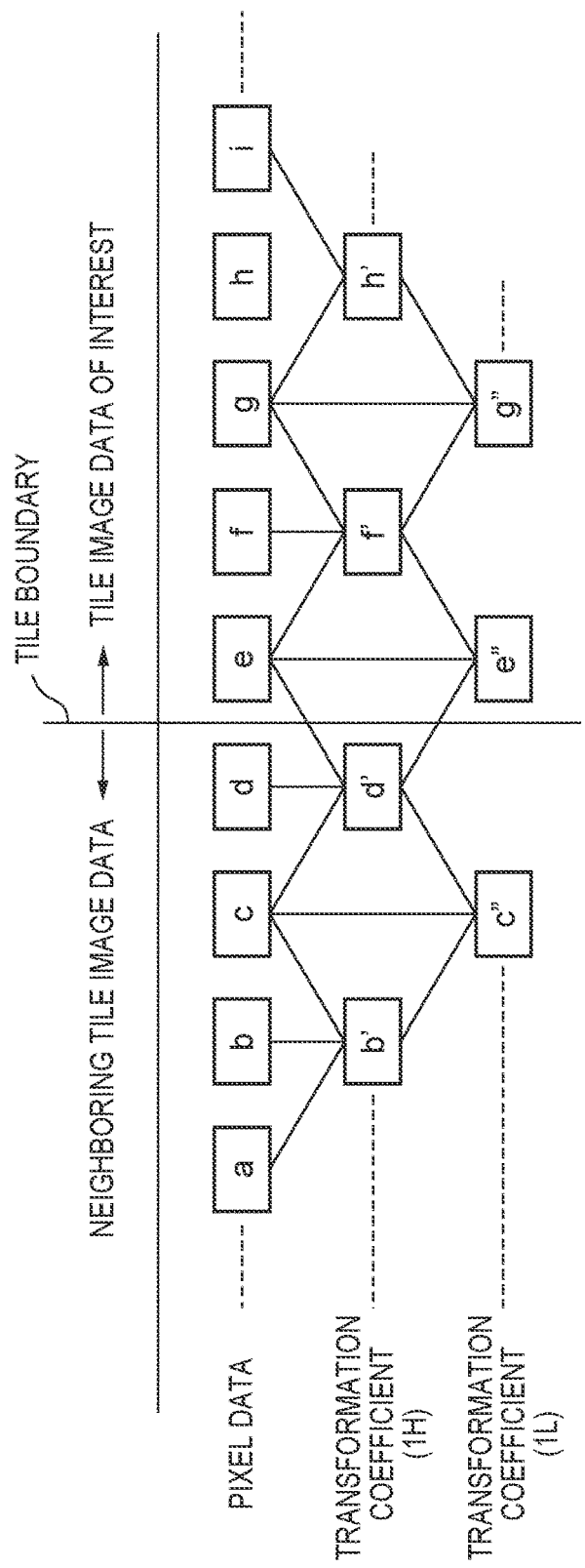
FIG. 3 is a view illustrating wavelet transform processing in the first embodiment.

FIG. 3 illustrates a lifting structure for the wavelet transform unit 103 to execute a wavelet transform that uses the previously described lossless 5/3 tap filter once. Because a wavelet transform is only executed once, the level of obtained transformation coefficient data becomes 1.

Reference signs a through i in FIG. 3 indicate one line of pixel data near a tile boundary of image data. The figure illustrates an example in which a tile boundary is present between pixels d and e, an example in which pixels e through i belong to tile image data of interest that is a wavelet transform target and pixels a through d belong to neighboring tile image data that is positioned to the left. If using a 5/3 tap filter to perform a wavelet transform, transformation coefficient data indicating a high frequency component is calculated with reference to three consecutive pixels. The b', d', f', and h' shown in the figure indicate transformation coefficients (1H) for high frequency components of the decomposition level 1. In addition, transformation coefficient data indicating low frequency components is calculated with reference to five consecutive pixels. The c", e", and g" shown in the figure indicate transformation coefficient data (1L) for low frequency components of the decomposition level 1.

Here, a case of decoding the pixel e that is closest to a tile boundary in the tile image data of interest is examined. To decode the pixel e, it is sufficient if there are the three pieces of the high-frequency transformation coefficient data d' and f' and the low-frequency transformation coefficient data e", as shown in the figure. Out of these, the high-frequency transformation coefficient data d' belongs to a tile that neighbors the tile image data of interest. The high-frequency transformation coefficient d' is calculated from a total of three pixels: the pixel e in the tile of interest, and the two pixels c and d of the neighboring tile. Therefore, the number of overlapping pixels for a tile image that neighbors to the left becomes "2" if a wavelet transform is performed once.

In this way, in a case of only performing a wavelet transform once when the position of a neighboring tile is to the left, the wavelet transform unit 103 performs the wavelet transform by inputting from the neighboring tile image data pixels c and d corresponding to the number of overlapping pixels "2" in addition to the tile image data of interest. The wavelet transform unit 103 supplies the quantizing unit 104 with transformation coefficient data d' obtained from the neighboring tile image data, in addition to the transformation coefficient data obtained from the tile image data of interest.

By the technique of the previously indicated D2, encoded data that is required to restore c and d of a neighboring tile image is generated in order to generate encoded data of the tile image data of interest. In other words, in the technique disclosed in D2, quantization and encoding that includes transformation coefficients b', c", and d' of a neighboring tile is performed when encoding a tile image of interest. In contrast to this, in the present embodiment, it is sufficient if the transformation coefficient data required in the neighboring tile is just d', and it is possible to further raise coding efficiency.

Note that, as in the tile image data A of FIG. 2A, if there is no neighboring tile above or to the left, mirror processing similar to conventional JPEG 2000 or the like is performed to generate pixels outside of the tile, and then a wavelet transform is performed.

Figure 4:
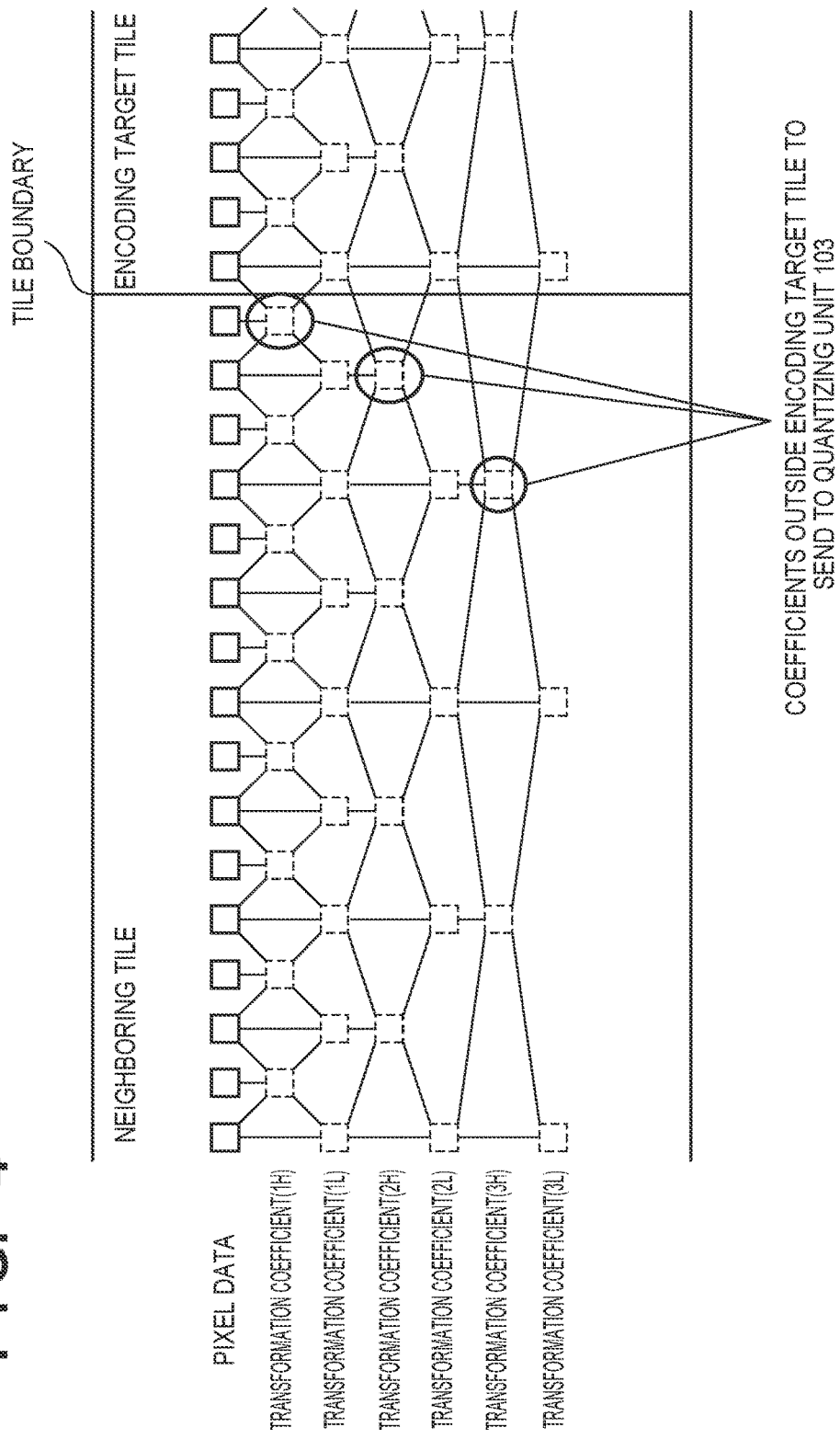
FIG. 4 is a view for explaining an execution method in a case of performing a wavelet transformation in the first embodiment three times.

In addition, because as the number of wavelet transforms increases (as the decomposition level increases) the amount of encoded data that can be reduced increases in comparison to the case of D2, an amount of generated code reduction effect according to the first embodiment is significantly apparent. FIG. 4 illustrates a lifting structure for obtaining transformation coefficients until a decomposition level 3 by using a lossless 5/3 tap filter.

In the case of FIG. 3 in which a wavelet transform is executed once, pixels overlapping from a neighboring tile that are to be input to generate transformation coefficients necessary to decode pixels on a left edge in the tile of interest are the two pixels as already explained by using FIG. 3. Meanwhile, in a case of performing a wavelet transform three times, there is a need to input 16 pixels from the neighboring tile image data as in FIG. 4.

In the case of D2, it is necessary to quantize and encode transformation coefficient data for 16 pixels: eight coefficients for the transformation coefficient data (1H), four coefficients for the transformation coefficient data (2H), two coefficients for the transformation coefficient data (3H), and two coefficients for the transformation coefficient data (3L). Therefore, the amount of encoded data is large to the extent that it cannot be ignored.

However, in the case of the first embodiment, transformation coefficient data generated from the neighboring tile image data that is needed to decode a pixel that is positioned on an edge of the tile image data of interest is the transformation coefficients surrounded by circles shown in the figure. In other words, this is only a total of three coefficients: one coefficient for the decomposition level 1 transformation coefficient data (1H), one coefficient for the decomposition level 2 transformation coefficient data (2H), and one coefficient for the decomposition level 3 transformation coefficient data (3H). Accordingly, it is sufficient if these three coefficients are quantized and encoded from the transformation coefficient data obtained from the neighboring tile image data. In other words, in comparison to D2, a number of transformation coefficients for the encoding target can be significantly reduced.

As is also known from FIG. 4, if the position of a neighboring tile is above or to the left, a relation, in the first embodiment, between a number of wavelet transforms and transformation coefficient data used out of the transformation coefficient data generated from the neighboring tile to restore a pixel at an edge in the tile of interest is as follows.

One wavelet transform is performed: one coefficient for the transformation coefficient data (1H)

Two wavelet transforms are performed: two coefficients for the transformation coefficient data (1H), (2H)

Three wavelet transforms are performed: three coefficients for the transformation coefficient data (1H), (2H), (3H)

Here, a number of times that the wavelet transform is executed is set as N. In such a case, it is possible to state that it is sufficient if the wavelet transform unit 103 supplies the quantizing unit 104 with the N pieces of the transformation coefficient data 1H, 2H, ..., NH closest to the tile boundary from the high-frequency transformation coefficient data of each decomposition level generated from a neighboring tile.

Next, with reference to FIGS. 11A through 11H, explanation is given regarding transformation coefficient data required to restore a pixel at the edge of a tile of interest out of transformation coefficient data generated from a neighboring tile when the position of the neighboring tile is below or to the right and a wavelet transform is performed three times.

Note that if a wavelet transform is performed three times, the transformation coefficient data 1H, the transformation coefficient data 2H, the transformation coefficient data 3H, and the transformation coefficient data 3L are quantized and encoded. In other words, the transformation coefficient data 1L and the transformation coefficient data 2L are not encoded. This is because the transformation coefficient data 1L can be generated from the transformation coefficient data 2H and the transformation coefficient data 2L, and in addition the transformation coefficient data 2L can be generated from the transformation coefficient data 3H and the transformation coefficient data 3L. In other words, if a wavelet transform is performed N times, the transformation coefficient data 1H, 2H, ..., and NH as well as the transformation coefficient data NL are encoded, whereas the transformation coefficient data 1L, 2L, ... (N−1)L is not encoded and is not recorded.

Figure 11A:
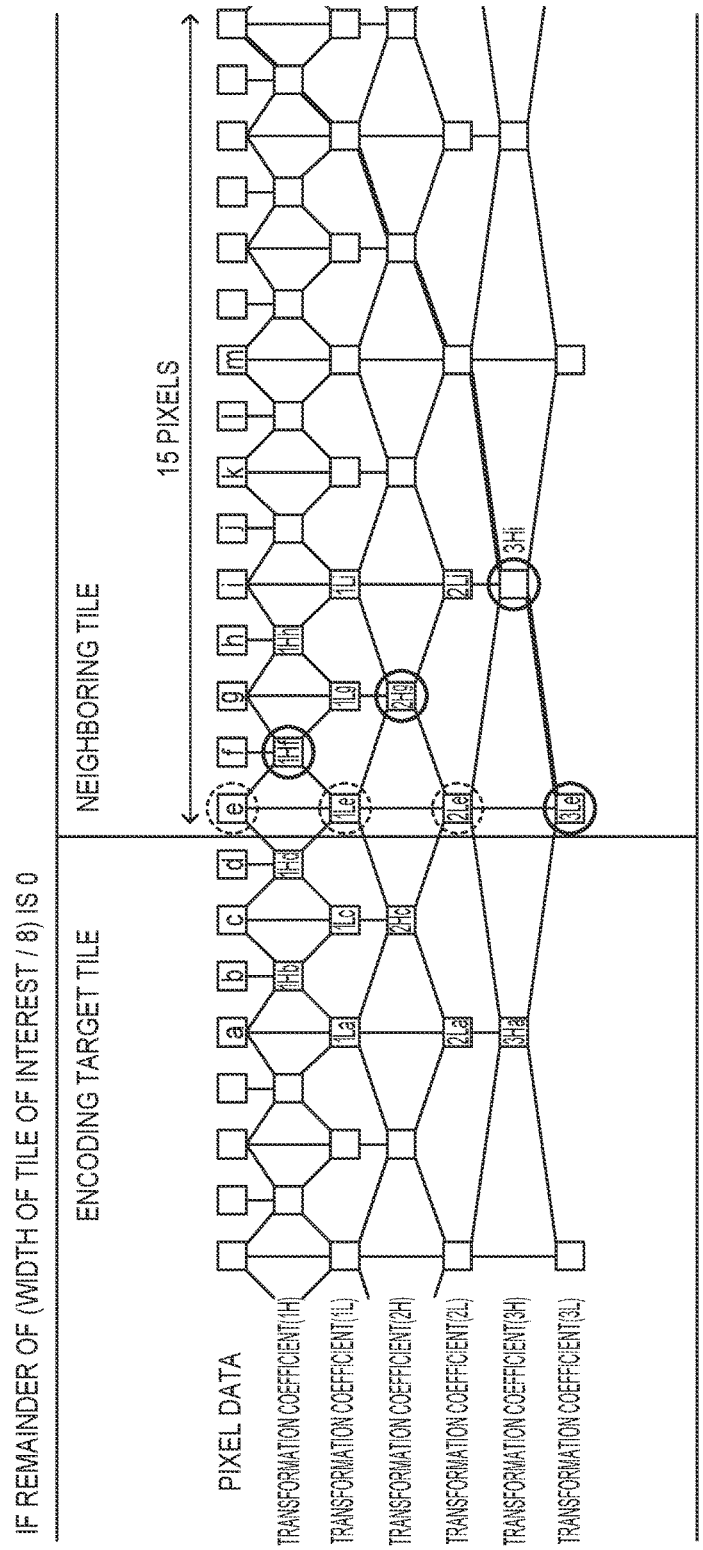

The above is common to the tile of interest and the neighboring tile. Below, in the light of these points, explanation is given regarding transformation coefficient data that becomes an encoding target in transformation coefficient data generated within the neighboring tile. FIG. 11A illustrates a case in which a wavelet transform is performed three times if a remainder is "0" after dividing by "8" a number of pixels in horizontal or vertical directions of a tile of interest that is an encoding target (a tile of interest width). In other words, the number of pixels in a horizontal direction or a vertical direction of the tile of interest is an integer multiple of 8.

To decode pixel d which is at an edge of an encoding target tile of interest, data for pixel c, the transformation coefficient data 1Hd, and pixel e is necessary. However, pixel e can be generated from the transformation coefficient data 1Hd, the transformation coefficient data 1Le, and the transformation coefficient data 1Hf. Here, the transformation coefficient data 1Le is transformation coefficient data for 1L, which is data that is not recorded, and can be generated from the transformation coefficient data 2Hc, the transformation coefficient data 2Le, and the transformation coefficient data 2Hg. Furthermore, the transformation coefficient data 2Le is data that is not recorded, and can be generated from the transformation coefficient data 3Ha, the transformation coefficient data 3Le, and the transformation coefficient data 3Hi. In other words, to decode pixel d which is at an edge of the encoding target tile of interest, it is sufficient if the transformation coefficient data 1Hf, the transformation coefficient data 2Hg, the transformation coefficient data 3Hi, and the transformation coefficient data 3Le—which are close to the boundary in the neighboring tile and are surrounded by solid lines in the figure—are present. If this transformation coefficient data is present, it is possible to decode even pixels at an edge of a neighboring tile side in the tile of interest. Therefore, in addition to the transformation coefficient data 1H, 2H, 3H, and 3L in the encoding target tile of interest, neighboring tile transformation coefficient data {1Hf, 2Hg, 3Hi, and 3Le} is encoded.

In addition, to calculate these pieces of transformation coefficient data, 15 pixels of the neighboring tile are necessary. Therefore, a wavelet transform is performed three times after inputting at least 15 pixels of the neighboring tile in addition to the tile of interest. When encoding, transformation coefficient data necessary to decode data of an edge portion of an encoding target tile of interest is encoded, without encoding all of the transformation coefficient data of a neighboring tile obtained by a wavelet transform. Of course, in the encoding target tile of interest, the transformation coefficient data 1H, 2H, 3H, and 3L is all encoded.

In other words, transformation coefficient data used out of the transformation coefficient data generated from the neighboring tile to restore a pixel at an edge in the tile of interest becomes a total of four coefficients: one coefficient for the subband 1H, one coefficient for the subband 2H, one coefficient for the subband 3H, and one coefficient for the subband 3L.

FIG. 11B illustrates a case in which a wavelet transform is performed three times if a remainder is "1" after dividing by "8" the number of pixels in horizontal or vertical directions of a tile of interest that is an encoding target (a tile of interest width).

To decode pixel e that is an edge of an encoding target tile of interest, the transformation coefficient data 1Le of 1L of the edge of the tile of interest, the transformation coefficient data 1Hd of 1H in the tile of interest, and the transformation coefficient data 1Hf of 1H of a neighboring tile become necessary. The transformation coefficient 1Le can be calculated from the transformation coefficients 2Hc and 2Le in the tile of interest, and the transformation coefficient data 2Hg in a neighboring tile. In addition, the transformation coefficient 2Le can be calculated from the transformation coefficients 3Ha and 3Le in the tile of interest, and the transformation coefficient data 3Hi in a neighboring tile.

Consequently, in the end, as illustrated in FIG. 11B, it is sufficient if the transformation coefficient data 1Hf, the transformation coefficient data 2Hg, and the transformation coefficient data 3Hi in the neighboring tile are present in addition to data in the tile of interest. If this transformation coefficient data is present, it is possible to decode even pixels at an edge of a neighboring tile side in the tile of interest. In addition, to calculate these pieces of transformation coefficient data, 14 pixels of the neighboring tile are necessary. Therefore, if the remainder of "tile of interest width/8" is 1, the wavelet transform is performed three times after inputting at least 14 pixels of the neighboring tile in addition to the tile of interest. When encoding, regarding the transformation coefficient data of the neighboring tile, the transformation coefficient data {1Hf, 2Hg, 3Hi} necessary to decode pixel e of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of three coefficients: one coefficient for the subband 1H, one coefficient for the subband 2H, one coefficient for the subband 3H, and zero coefficients for the subband 3L.

Figure 11C:
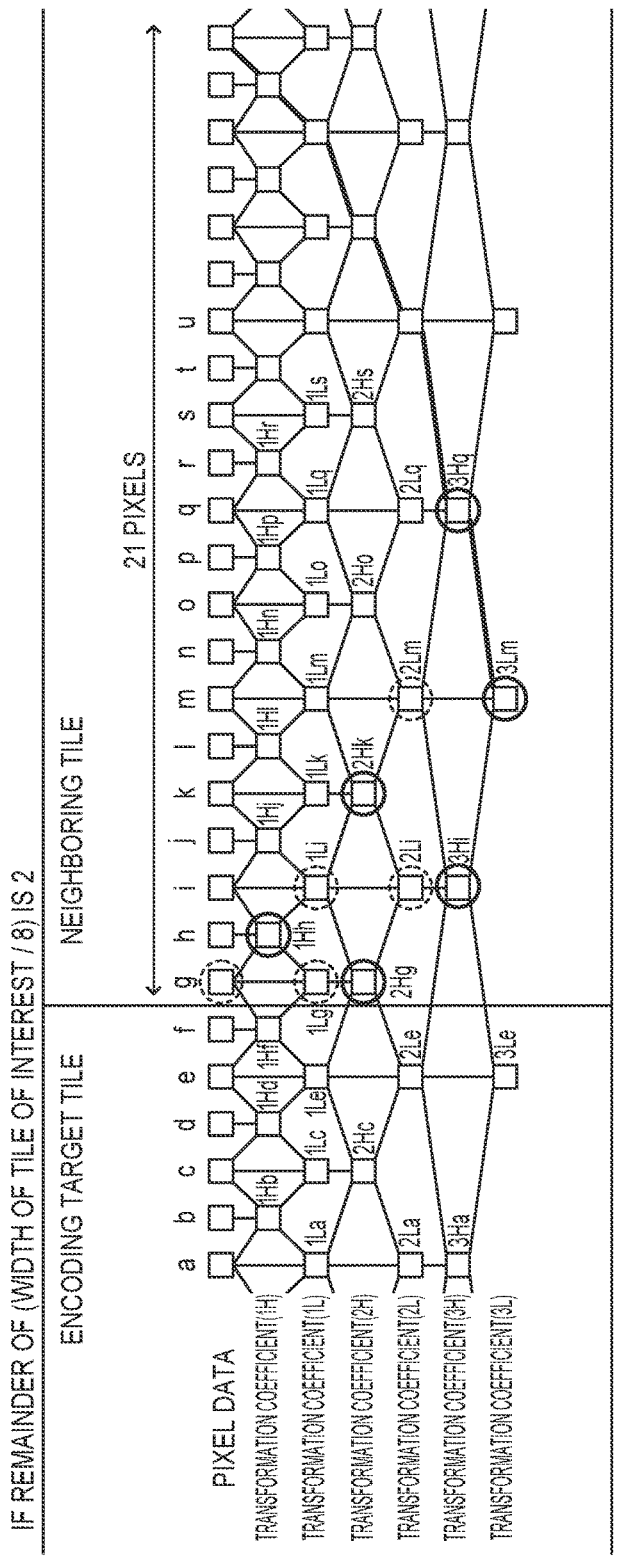

FIG. 11C illustrates a case in which a wavelet transform is performed three times if a remainder is "2" after dividing by "8" a number of pixels in horizontal or vertical directions of a tile of interest that is an encoding target (a tile of interest width).

To decode pixel f, which is at an edge of the tile of interest, pixel e of the tile of interest, the transformation coefficient data 1Hf of 1H of the tile of interest, and pixel g become necessary. To decode pixel g, the transformation coefficient data 1Hf of 1H in the tile of interest, the transformation coefficient data 1Lg of 1L in a neighboring tile, and the transformation coefficient data 1Hf of 1H in a neighboring tile become necessary. Out of these, because the transformation coefficient data 1Lg of 1L is not recorded, it is necessary to generate it. The transformation coefficient data 1Lg can be calculated from the transformation coefficient 1Le in the tile of interest, and the transformation coefficient data 2Hg and 1Li in a neighboring tile. Because the transformation coefficient data 1Le and 1Li of 1L are not recorded, it is necessary to calculate them. The transformation coefficient data 1Le can be calculated from the transformation coefficient data 2Hc and 2Le in the tile of interest and 2Hg in the neighboring tile. 2Le, which is 2L transformation coefficient data that is not recorded, can be calculated from 2Ha and 3Le in the tile of interest, and 3Hi in the neighboring tile. In addition, the transformation coefficient data 1Li can be calculated from the transformation coefficient data 2Hg, 2Li, and 2Hk in the neighboring tile. 2Li, which is 2L transformation coefficient data that is not recorded, can be calculated from the transformation coefficient data 2Le in the tile of interest and 3Hi and 2Lm in the neighboring tile. In addition, 2Lm, which is 2L transformation coefficient data that is not recorded can be calculated from the transformation coefficient data 3Hi, 3Lm, and 3Hq in the neighboring tile. Consequently, in the end, as illustrated in FIG. 11C, in addition to data in the encoding target tile of interest, it is sufficient if the transformation coefficient data 1Hh, the transformation coefficient data 2Hg, the transformation coefficient data 2Hk, the transformation coefficient data 3Hi, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 21 pixels of the neighboring tile are necessary. Therefore, if the remainder of "tile of interest width/8" is 2, the wavelet transform is performed after inputting at least 21 pixels of the neighboring tile in addition to the tile of interest. When encoding, for neighboring tile transformation coefficient data, the transformation coefficient data {1Hh, 2Hg, 2Hk, 3Hi, 3Hq, 3Lm} is encoded instead of all transformation coefficients obtained by the wavelet transform.

In other words, transformation coefficient data used out of the transformation coefficient data generated from the neighboring tile to restore a pixel at an edge in the tile of interest becomes a total of six coefficients: one coefficient for the subband 1H, two coefficients for the subband 2H, two coefficients for the subband 3H, and one coefficient for the subband 3L.

FIG. 11D illustrates a case in which a wavelet transform is performed three times if a remainder is "3" after dividing by "8" a number of pixels in horizontal or vertical directions of a tile of interest that is an encoding target (a tile of interest width).

To decode pixel g at an edge of the tile of interest, 1L transformation coefficient data 1Lg and 1H transformation coefficient data 1Hf of an edge portion of the tile of interest, as well as 1H transformation coefficient data 1Hh in a neighboring tile become necessary. Out of these, because the transformation coefficient data 1Lg of 1L is not recorded, it is necessary to calculate it from other transformation coefficient data. The transformation coefficient data 1Lg can be calculated from 1Le and 2Hg in the tile of interest, and 1Li in the neighboring tile. Because 1Le and 1Li, which are 1L transformation coefficient data, are not recorded, they need to be calculated from other transformation coefficient data. The transformation coefficient data 1Le can be calculated from the transformation coefficient data 2Hc, 2Le, and 2Hg in the tile of interest. 2Le, which is 2L transformation coefficient data that is not recorded, can be calculated from the transformation coefficient data 3Ha and 3Le in the tile of interest and the transformation coefficient data 3Hi in the neighboring tile. In addition, transformation coefficient data 1Li can be calculated from the transformation coefficient data 2Hg in the tile of interest and the transformation coefficient data 2Li and 2Hk in a neighboring tile. 2Li, which is 2L transformation coefficient data that is not recorded, can be calculated from the transformation coefficient data 2Le in the tile of interest and 3Hi and 2Lm in the neighboring tile. 2Lm, which is 2L transformation coefficient data that is not recorded, can be calculated from the transformation coefficient data 3Hi, 3Lm, and 3Hq in the neighboring tile. Accordingly, in the end, as illustrated in FIG. 11D, in addition to data in the encoding target tile of interest, it is sufficient if the transformation coefficient data 1Hh, the transformation coefficient data 2Hk, the transformation coefficient data 3Hi, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 20 pixels of the neighboring tile are necessary. Therefore, if the remainder of "tile of interest width/8" is 3, the wavelet transform is performed after inputting at least 20 pixels of the neighboring tile in addition to the tile of interest. When encoding, regarding the transformation coefficient data of the neighboring tile, the transformation coefficient data {1Hh, 2Hk, 3Hi, 3Hq, 3Lm} necessary to decode pixel g of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of five coefficients: one coefficient for the subband 1H, one coefficient for the subband 2H, two coefficients for the subband 3H, and one coefficient for the subband 3L.

Figure 11E:
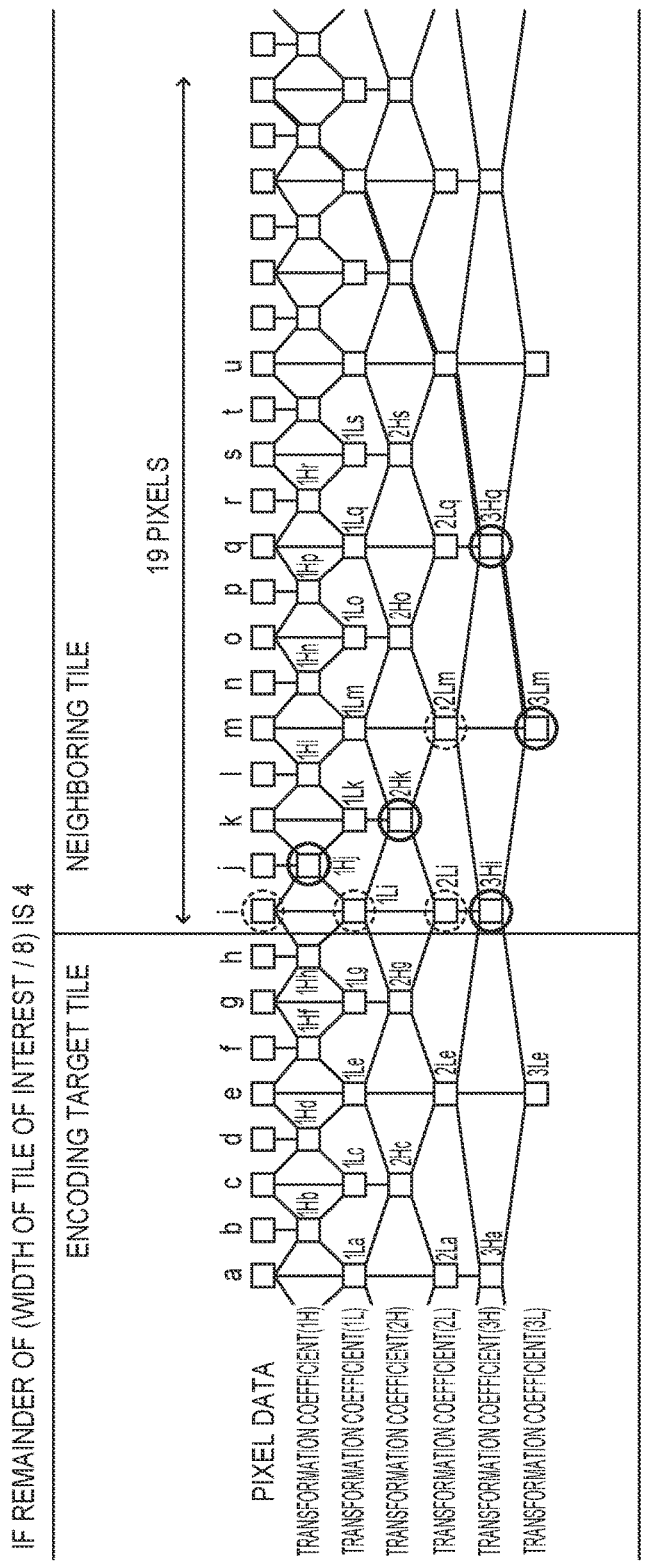

FIG. 11E illustrates a case in which a wavelet transform is performed three times if a remainder is "4" after dividing by "8" a number of pixels in horizontal or vertical directions of a tile of interest that is an encoding target (a tile of interest width).

To decode pixel h, which is at an edge of the tile of interest, pixel g in the tile of interest, the transformation coefficient data 1Hh for the tile of interest, and pixel i in the neighboring tile become necessary. To decode the pixel i, the transformation coefficient data 1Hh in the tile of interest as well as the transformation coefficient data 1Li and 1Hj in the neighboring tile become necessary. 1Li, which is 1L transformation coefficient data that is not recorded, can be calculated from the transformation coefficient data 2Hg in the tile of interest and the transformation coefficient data 2Li and 2Hk in the neighboring tile. 2Li, which is 2L transformation coefficient data that is not recorded, can be calculated from the transformation coefficient data 2Le in the tile of interest and the transformation coefficient data 3Hi and 2Lm in the neighboring tile. The transformation coefficient data 2Le can be calculated from the transformation coefficient data 3Ha, 3Le, and 3Hi in the tile of interest. 2Lm, which is 2L transformation coefficient data that is not recorded, can be calculated from the transformation coefficient data 3Hi, 3Lm, and 3Hq in the neighboring tile. Accordingly, in the end, as illustrated in FIG. 11E, in addition to data in the encoding target tile of interest, it is sufficient if the transformation coefficient data 1Hj, the transformation coefficient data 2Hk, the transformation coefficient data 3Hi, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 19 pixels of the neighboring tile are necessary. Therefore, if the remainder of "tile of interest width/8" is 4, the wavelet transform is performed after inputting at least 19 pixels of the neighboring tile in addition to the tile of interest. When encoding, regarding the transformation coefficient data of the neighboring tile, the transformation coefficient data {1Hj, 2Hk, 3Hi, 3Hq, 3Lm} necessary to decode pixel h of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of five coefficients: one coefficient for the subband 1H, one coefficient for the subband 2H, two coefficients for the subband 3H, and one coefficient for the subband 3L.

FIG. 11F illustrates a case in which a wavelet transform is performed three times if a remainder is "5" after dividing by "8" a number of pixels in horizontal or vertical directions of a tile of interest that is an encoding target (a tile of interest width).

To decode the pixel i which is at an edge of the tile of interest, the transformation coefficient data 1Hh and 1Li of the tile of interest, and the transformation coefficient data 1Hj of the neighboring tile become necessary. In addition, transformation coefficient data 1Li can be calculated from the transformation coefficient data 2Hg and 2Li in the tile of interest and the transformation coefficient data 2Hk in a neighboring tile. The transformation coefficient data 2Li can be calculated from the transformation coefficient data 2Le and 3Hi in the tile of interest and the transformation coefficient data 2Lm in a neighboring tile. For the transformation coefficient data 2Lm, the transformation coefficient data 3Hi in the tile of interest and the transformation coefficient data 3Lm and 3Hq in a neighboring tile are necessary. Accordingly, in the end, as illustrated in FIG. 11F, in addition to data in the encoding target tile of interest, it is sufficient if the transformation coefficient data 1Hj, the transformation coefficient data 2Hk, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 18 pixels of the neighboring tile are necessary. Therefore, if the remainder of "tile of interest width/8" is 5, the wavelet transform is performed after inputting at least 18 pixels of the neighboring tile in addition to the tile of interest. When encoding, regarding the transformation coefficient data of the neighboring tile, the transformation coefficient data {1Hj, 2Hk, 3Hq, 3Lm} necessary to decode pixel i of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of four coefficients: one coefficient for the subband 1H, one coefficient for the subband 2H, one coefficient for the subband 3H, and one coefficient for the subband 3L.

Figure 11G:
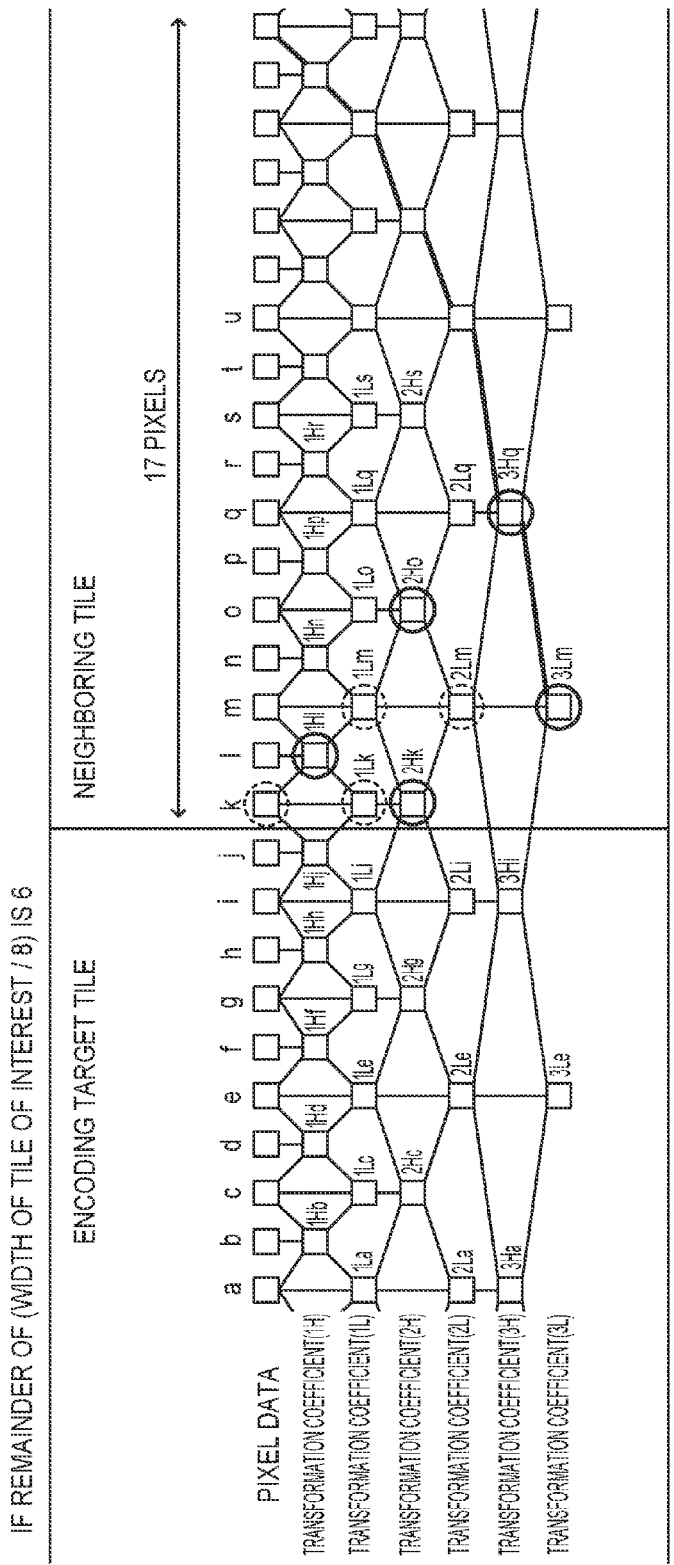

FIG. 11G illustrates a case in which a wavelet transform is performed three times if a remainder is "6" after dividing by "8" a number of pixels in horizontal or vertical directions of a tile of interest that is an encoding target (a tile of interest width).

To decode pixel j, which is at an edge of the tile of interest, pixel i in the tile of interest, the transformation coefficient data 1Hj, and pixel k in the neighboring tile become necessary. To decode the pixel k of the neighboring tile, the transformation coefficient data 1Hj in the tile of interest as well as the transformation coefficient data 1Lk and 1Hl in the neighboring tile become necessary. The transformation coefficient data 1Lk can be calculated from the transformation coefficient data 1Li in the tile of interest and the transformation coefficient data 2Hk and 1Lm in the neighboring tile. The transformation coefficient data 1Lm can be calculated from the transformation coefficient data 2Hk, 2Lm, and 2Ho in the neighboring tile. The transformation coefficient data 2Lm can be calculated from the transformation coefficient data 3Hi in the tile of interest and the transformation coefficient data 3Lm and 3Hq in the neighboring tile. Note that, for the transformation coefficient data 1Li and 2Li in the tile of interest that are not recorded, they can be calculated from transformation coefficients recorded in the tile of interest and the transformation coefficients 2Hk and 2Lm in the neighboring tile. Consequently, in the end, as illustrated in FIG. 11G, in addition to data in the encoding target tile of interest, it is sufficient if the transformation coefficient data 1Hl, the transformation coefficient data 2Hk, the transformation coefficient data 2Ho, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 17 pixels of the neighboring tile are necessary. Therefore, if the remainder of "tile of interest width/8" is 6, the wavelet transform is performed after inputting at least 17 pixels of the neighboring tile in addition to the tile of interest. When encoding, regarding the transformation coefficient data of the neighboring tile, the transformation coefficient data {1Hl, 2Hk, 2Ho, 3Hq, 3Lm} necessary to decode pixel j of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of five coefficients: one coefficient for the subband 1H, two coefficients for the subband 2H, one coefficient for the subband 3H, and one coefficient for the subband 3L.

Figure 11H:
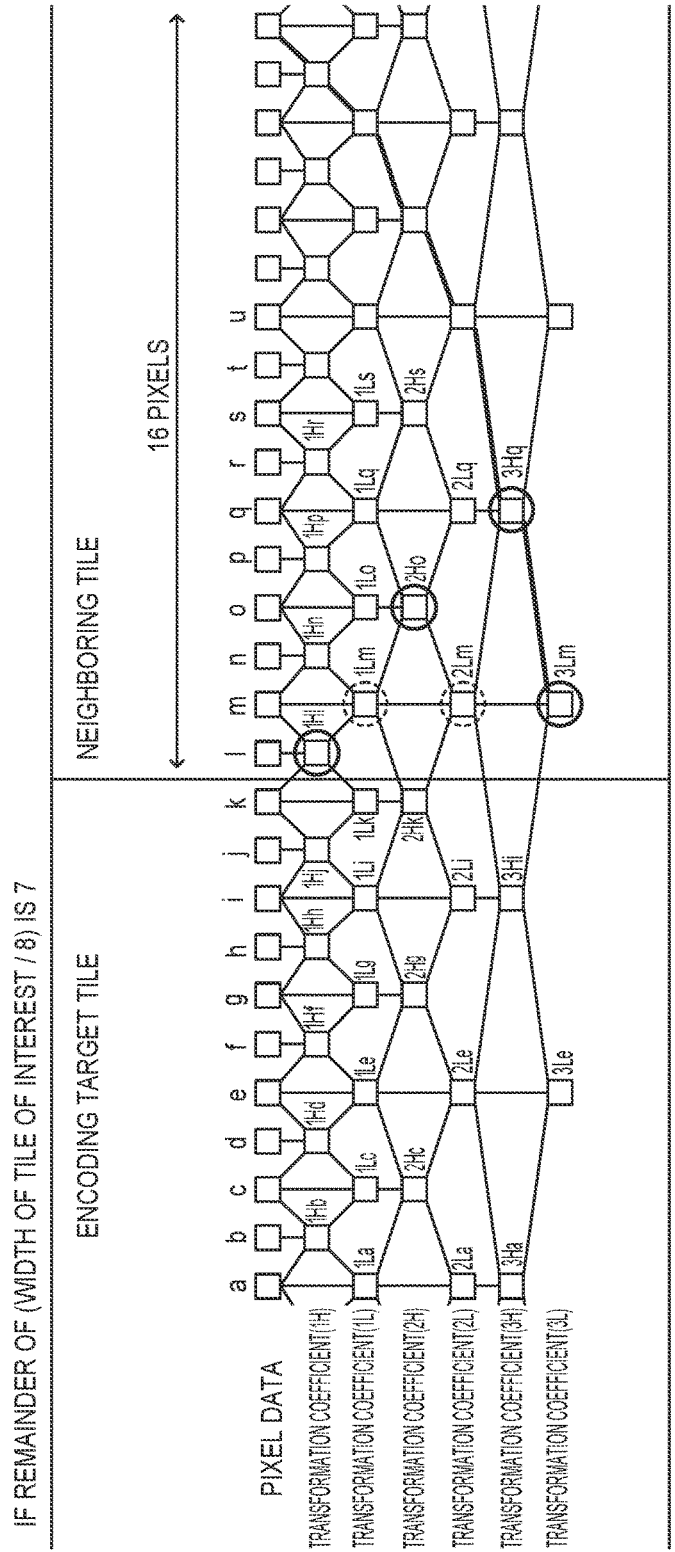

FIG. 11H illustrates a case in which a wavelet transform is performed three times if a remainder is "7" after dividing by "8" a number of pixels in horizontal or vertical directions of a tile of interest that is an encoding target (a tile of interest width).

To decode the pixel k which is at an edge of the tile of interest, the transformation coefficient data 1Hj and 1Lk of the tile of interest, and the transformation coefficient data 1Hl of the neighboring tile become necessary. The transformation coefficient data 1Lk can be calculated from the transformation coefficient data 1Li and 2Hk in the tile of interest and the transformation coefficient data 1Lm in the neighboring tile. The transformation coefficient data 1Lm can be calculated from the transformation coefficient data 2Hk in the tile of interest and the transformation coefficient data 2Lm and 2Ho in the neighboring tile. The transformation coefficient data 2Lm can be calculated from the transformation coefficient data 3Hi in the tile of interest and the transformation coefficient data 3Lm and 3Hq in the neighboring tile. In addition, while a detailed explanation is omitted, for the transformation coefficient data at an edge for 1L and 2L that is not recorded in the tile of interest, they can also be calculated from the transformation coefficient data recorded in the tile of interest, as well as the transformation coefficient data 1Lm and 2Lm in the neighboring tile. Consequently, in the end, as illustrated in FIG. 11H, in addition to data in the encoding target tile of interest, it is sufficient if the transformation coefficient data 1Hl, the transformation coefficient data 2Ho, the transformation coefficient data 3Hi, the transformation coefficient data 3Hq, and the transformation coefficient data 3Lm in the neighboring tile are present. If this transformation coefficient data is present, it is possible to decode even pixels at an edge of a neighboring tile side in the tile of interest. In addition, to calculate these pieces of transformation coefficient data, 16 pixels of the neighboring tile are necessary. Therefore, if the remainder of "tile of interest width/8" is 7, the wavelet transform is performed after inputting at least 16 pixels of the neighboring tile in addition to the tile of interest. When encoding, regarding the transformation coefficient data of the neighboring tile, the transformation coefficient data {1Hl, 2Ho, 3Hq, 3Lm} necessary to decode pixel k of an edge portion of the tile of interest and transformation coefficient data for the edge portion is encoded instead of all transformation coefficients obtained by the wavelet transform.

In other words, transformation coefficient data used out of the transformation coefficient data generated from the neighboring tile to restore a pixel at an edge in the tile of interest becomes a total of four coefficients: one coefficient for the subband 1H, one coefficient for the subband 2H, one coefficient for the subband 3H, and one coefficient for the subband 3L.

In this way, from the transformation coefficient data generated from the neighboring tile, if the transformation coefficient data necessary to restore a pixel of an edge in the tile of interest is obtained, it becomes as in the figures of FIGS. 10A and 10B. Note that, it is illustrated that the number of pieces of the transformation coefficient data illustrated in FIGS. 10A and 10B from a tile of interest side out of the transformation coefficient data in the neighboring tile is necessary in order to restore a pixel on an edge in the tile of interest.

For the transformation coefficient data of a high-frequency component subband, one or more is always necessary, and for the transformation coefficient data 1H, it is always one regardless of a number of wavelet transforms. A number of pieces of transformation coefficient data other than 1H differs in accordance with the width of the tile of interest. In addition, for transformation coefficient data of a low frequency component subband encoded when a number of wavelet transforms is N times—in other words the transformation coefficient data (NL), the number of pieces of the transformation coefficient data (NL) necessary to restore a pixel at an edge of the tile of interest becomes 0 or 1, and is determined in accordance with the width of the tile of interest.

As in the flow explained later, it is possible to accelerate processing and reduce an amount of encoded data by performing a wavelet transform in accordance with the number of overlapping pixels and the numeric values illustrated in FIGS. 10A and 10B, and further encode only a number of pieces of transformation coefficient data of the transformation coefficient data necessary for decoding of the tile of interest from a tile of interest side in the neighboring tile.

In addition, in the above description the transformation coefficient data in the neighboring tile is transformation coefficient data obtained by referring to pixels of the neighboring tile, and indicates transformation coefficient data included in a neighboring tile side if a tile boundary is set between a pixel of the tile of interest and a pixel of the neighboring tile and transformation coefficients are divided in the tile of interest side and the neighboring tile side by this tile boundary.

The above is an example of using a lossless 5/3 tap filter, but in a case of performing a wavelet transform that uses a lossy 9/7 tap filter for example, it is possible to have a difference with D2 be even greater.

Figure 5:
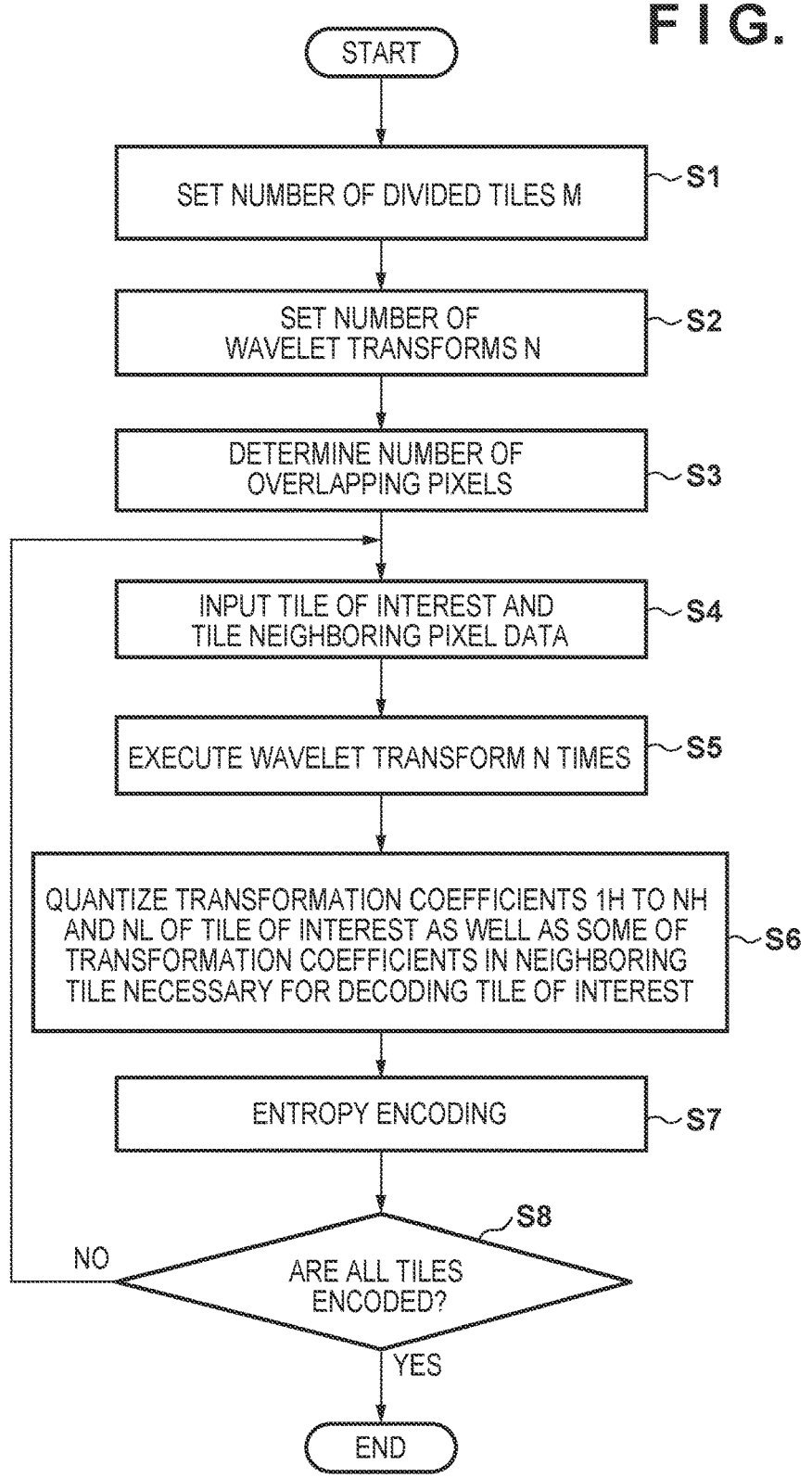
FIG. 5 is a flowchart illustrating a procedure for encoding processing in the first embodiment.

Here, processing of the image encoding unit 100 of the above described first embodiment is explained in accordance with the flowchart of FIG. 5.

In steps S1 and S2, the setting unit 106 sets a number of divided tiles M of one frame image, a number of wavelet transforms N (or number of decomposition levels N). In step S3, the setting unit 106 decides a number of overlapping pixels that indicates a number of tile neighboring pixels for when performing a wavelet transform of each tile. The setting unit 106 holds tables such as FIGS. 10A and 10B, and the number of overlapping pixels is decided as in FIGS. 10A and 10B in accordance with the tile width and the number of wavelet transforms N set in step S2—the number of overlapping pixels being respectively decided for a case in which the neighboring tile is above or to the left or a case in which the neighboring tile is below or to the right. In addition, because a number of overlapping pixels in the case when the neighboring tile is below or to the right differs in accordance with a width of the encoding target tile of interest, configuration may be taken to decide the number of overlapping pixels for each tile of interest and not decide the number of overlapping pixels together for all tiles as in FIG. 5. In addition, configuration may be taken such that processing is switched to decide in one batch if the tile widths are all the same, or decide for each tile of interest if the tile width differs for each tile.

Subsequently, in step S4, the data input controller 102, based on the information decided in steps S1 and S3, reads from the frame memory 101 the tile image data of interest and the tile neighboring pixel data (pixel data at an edge of a tile of interest side of the neighboring tile), and supplies them to the wavelet transform unit 103. In step S5, the wavelet transform unit 103 executes a wavelet transform for only a set number of times, and generates transformation coefficient data. In step S6, the wavelet transform unit 103 supplies the quantizing unit 104 with all transformation coefficient data of a subband that is an encoding target and is obtained from the tile image data of interest. In addition, for the transformation coefficient data obtained from the tile neighboring pixel data, the wavelet transform unit 103 supplies the quantizing unit 104 with a number of pieces of transformation coefficient data necessary to decode a pixel at an edge of the tile of interest illustrated in FIGS. 10A and 10B from an edge portion of a tile boundary side. The quantizing unit 104 receives this and executes quantization processing. As illustrated in FIGS. 10A and 10B, a number of pieces of transformation coefficient data supplied to the quantizing unit 104 differs in accordance with a tile width of the tile of interest or a number of wavelet transforms, and the number of pieces of transformation coefficient data supplied to the quantizing unit 104 is defined for each subband.

Subsequently, in step S7, the entropy encoding unit 105 performs entropy encoding on the transformation coefficient data after the quantization, and generates encoded data. In step S8, until encoding of all tiles completes, processing by the data input controller 102, the wavelet transform unit 103, the quantizing unit 104, and the entropy encoding unit 105 is repeated.

Note that, if encoding a moving image, processing for step S4 onward may be repeated for a second frame onward.

In the present embodiment, a relation as in FIGS. 10A and 10B is used to perform encoding of a tile of interest.

In other words, if the position of a neighboring tile is below or to the right, a number of overlapping pixels and the transformation coefficient data to encode from the transformation coefficient data of the neighboring tile are determined in accordance with the width of the tile of interest and the number of wavelet transforms.

However, regardless of the width of the tile of interest in a variation such as below, configuration may be taken to determine a number of overlapping pixels and the transformation coefficient data to encode out of the transformation coefficient data of a neighboring tile.

According to FIGS. 10A and 10B, if the number of wavelet transforms is one, a number of pieces of transformation coefficient data required to restore a pixel at an edge in the tile of interest out of subbands to encode (1H, 1L) becomes 0 or 1, and the number of overlapping pixels becomes 2 or 3. Therefore, if the number of wavelet transforms is one, then the number of overlapping pixels is set to 3, and the number of pieces of transformation coefficient data of the neighboring tile to encode is set to 1.

If the number of wavelet transforms is two, out of the subbands (1H, 2H, 2L) to encode, the number of pieces of transformation coefficient data necessary to restore a pixel at an edge in the tile of interest becomes 1 for 1H, 1 or 2 for 2H, 0 or 1 for 2L, and the number of overlapping pixels becomes 6 to 9. Therefore, if the number of wavelet transforms is two, then the number of overlapping pixels is set to 9, and the number of pieces of transformation coefficient data of the neighboring tile to encode is set to 1 for 1H, 2 for 2H, and 1 for 2L. In addition, a number of pieces of transformation coefficient data of the neighboring tile to encode, may be set to two for all subbands (1H, 2H, 2L) that are to be encoded.

If the number of wavelet transforms is three, out of the subbands (1H, 2H, 3H, 3L) to encode, the number of pieces of transformation coefficient data necessary to restore a pixel at an edge in the tile of interest becomes 1 for 1H, 1 or 2 for 2H, 1 or 2 for 3H, and 0 or 1 for 3L, and the number of overlapping pixels becomes 14 to 21. Therefore, if the number of wavelet transforms is three, then the number of overlapping pixels is set to 21, and the number of pieces of transformation coefficient data of the neighboring tile to encode is set to 1 for 1H, 2 for 2H, 2 for 3H, and 1 for 3L. In addition, a number of pieces of transformation coefficient data of the neighboring tile to encode, may be set to two for all subbands (1H, 2H, 3H, 3L) that are to be encoded.

In the present variation, an encoding amount increases in comparison to FIGS. 10A and 10B of the first embodiment, but even with transformation coefficient data of a neighboring tile obtained by a wavelet transform, there is coefficient data that is not encoded. Therefore, it is possible to reduce a data amount in comparison to encoding all transformation coefficient data for a neighboring tile obtained by a wavelet transform.

Figure 6:
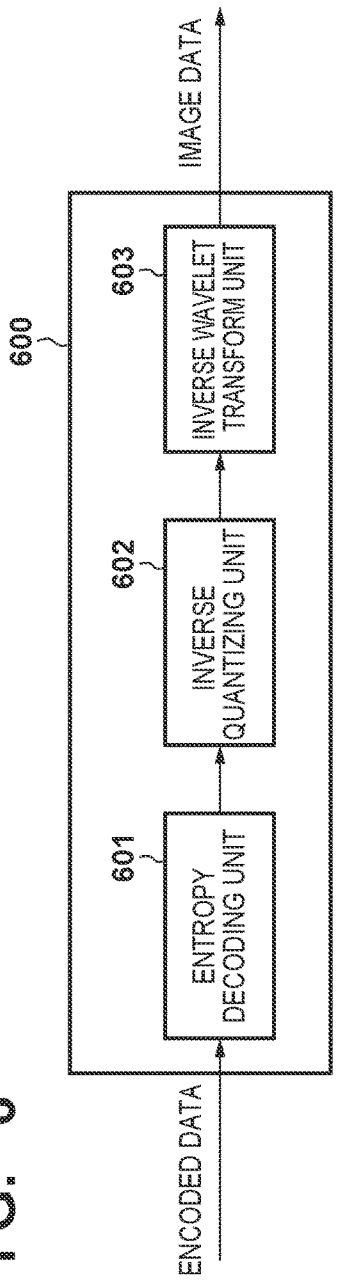
FIG. 6 is a block configuration diagram for a decoding unit in a first embodiment.

Next, while using FIG. 6, explanation is given regarding decoding of the encoded data obtained by using the first embodiment. FIG. 6 depicts a block configuration diagram of a decoding unit 600 in the first embodiment. The decoding unit 600 is provided in the image capturing apparatus.

The decoding unit 600 has an entropy decoding unit 601, an inverse quantizing unit 602, and an inverse wavelet transform unit 603.

The entropy decoding unit 601 is input with and decodes data that has been subject to entropy encoding such as EBCOT (Embedded Block Coding with Optimized Truncation) in units of tiles. The entropy decoding unit 601 supplies the inverse quantizing unit 602 with the quantization parameter and the transformation coefficient data after quantization that is obtained by decoding.

The inverse quantizing unit 602 multiplies the transformation coefficient data sent from the entropy decoding unit

601 by the quantization parameter obtained by decoding to calculate the transformation coefficient data before the quantization. The inverse quantizing unit 602 supplies the calculated transformation coefficient data to the inverse wavelet transform 603.

The inverse wavelet transform unit 603 executes an inverse wavelet transform on the transformation coefficient data sent from the inverse quantizing unit 602 to restore the tile image data.

Figure 7:
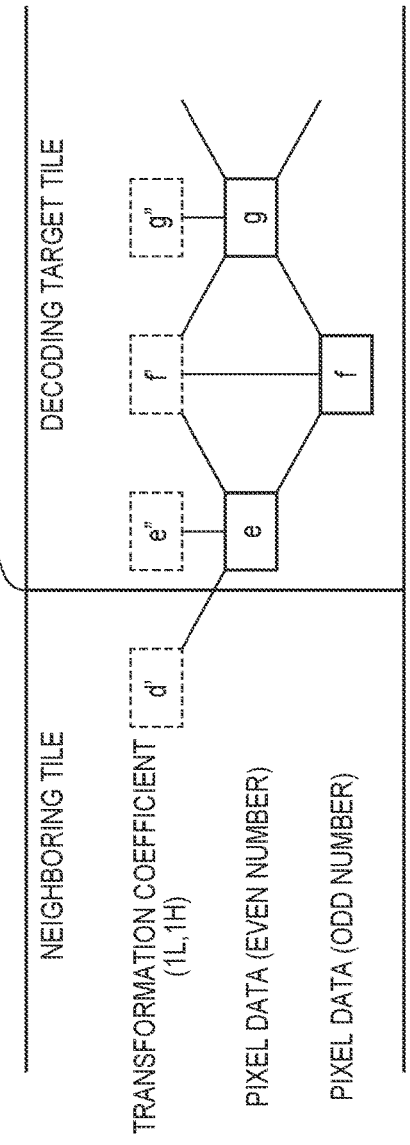
FIG. 7 is a view for explaining an inverse wavelet transform method in the first embodiment.

Here, using FIG. 7 explanation is given of decoding processing of the decoding unit 600 in a case in which encoding is performed by a lifting structure wavelet transform that uses the previously described lossless 5/3 tap filter.

FIG. 7 is a view that illustrates a situation of using a lifting structure to perform an inverse wavelet transform on coefficients generated by a wavelet transform explained by using FIG. 3. The d', e'', f', and g'' of FIG. 7 corresponds to the d', e'', f', and g'' of FIG. 3. In other words, d' and f' are decomposition level 1 high-frequency transformation coefficient data (1H), and e'' and g'' indicate decomposition level 1 low frequency transformation coefficient data (1L). Out of these the transformation coefficient data d' belongs to a neighboring tile image. It is possible to generate pixel e of the edge of the tile of interest from the coefficient data d', e'', and f'.

In this way, in the first embodiment, when generating pixel data e of the tile boundary, a wavelet coefficient d' that belongs to a neighboring tile that is not a decoding tile target and is encoded in advance as in FIG. 7 is used to perform decoding. Accordingly, it becomes possible to prevent generation of image degradation in a tile boundary where continuity has been maintained between tiles that neighbor.

Second Embodiment

Figure 8:
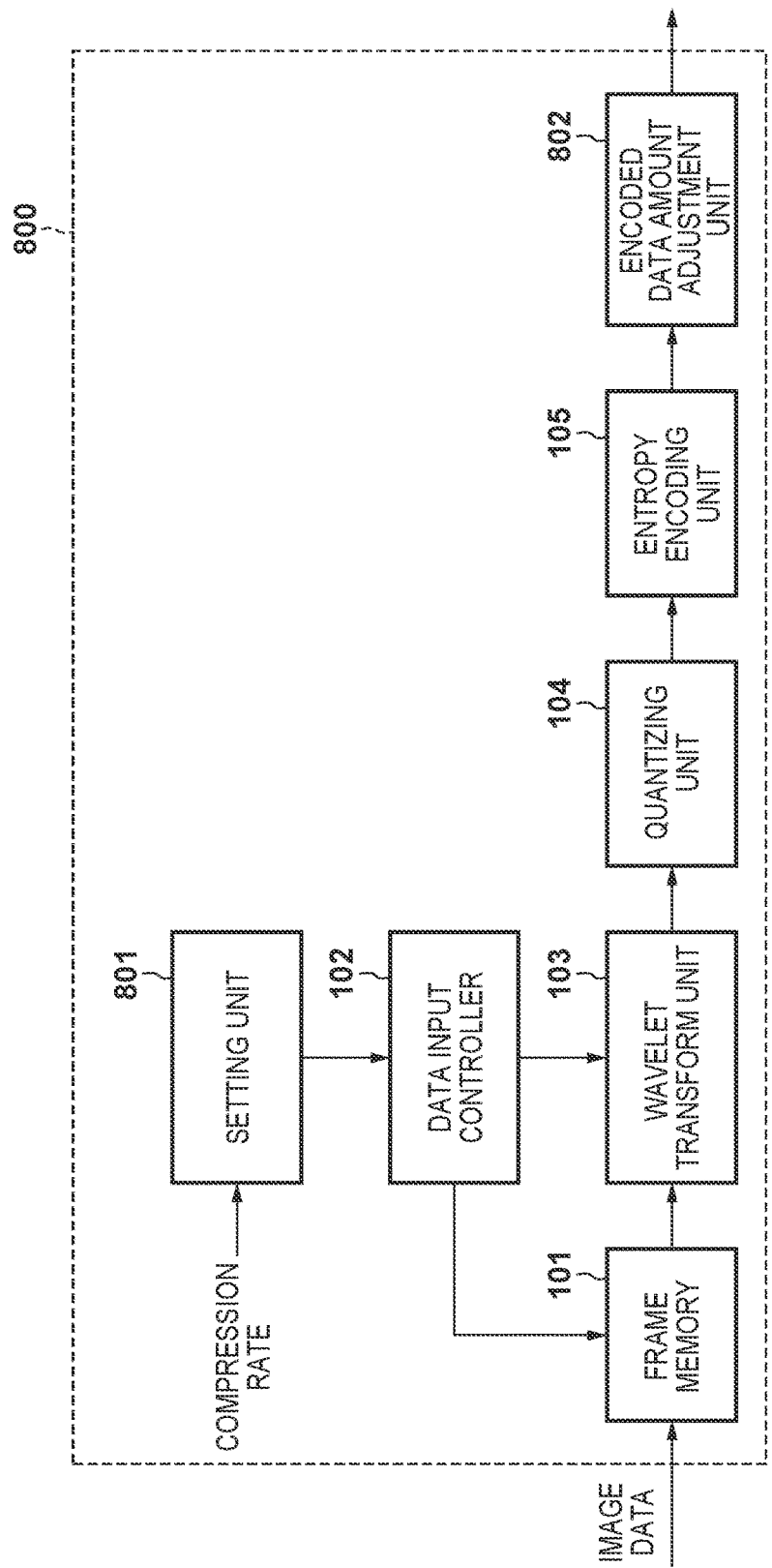
FIG. 8 is a block configuration diagram for an image encoding unit in a second embodiment.
Figure 9:
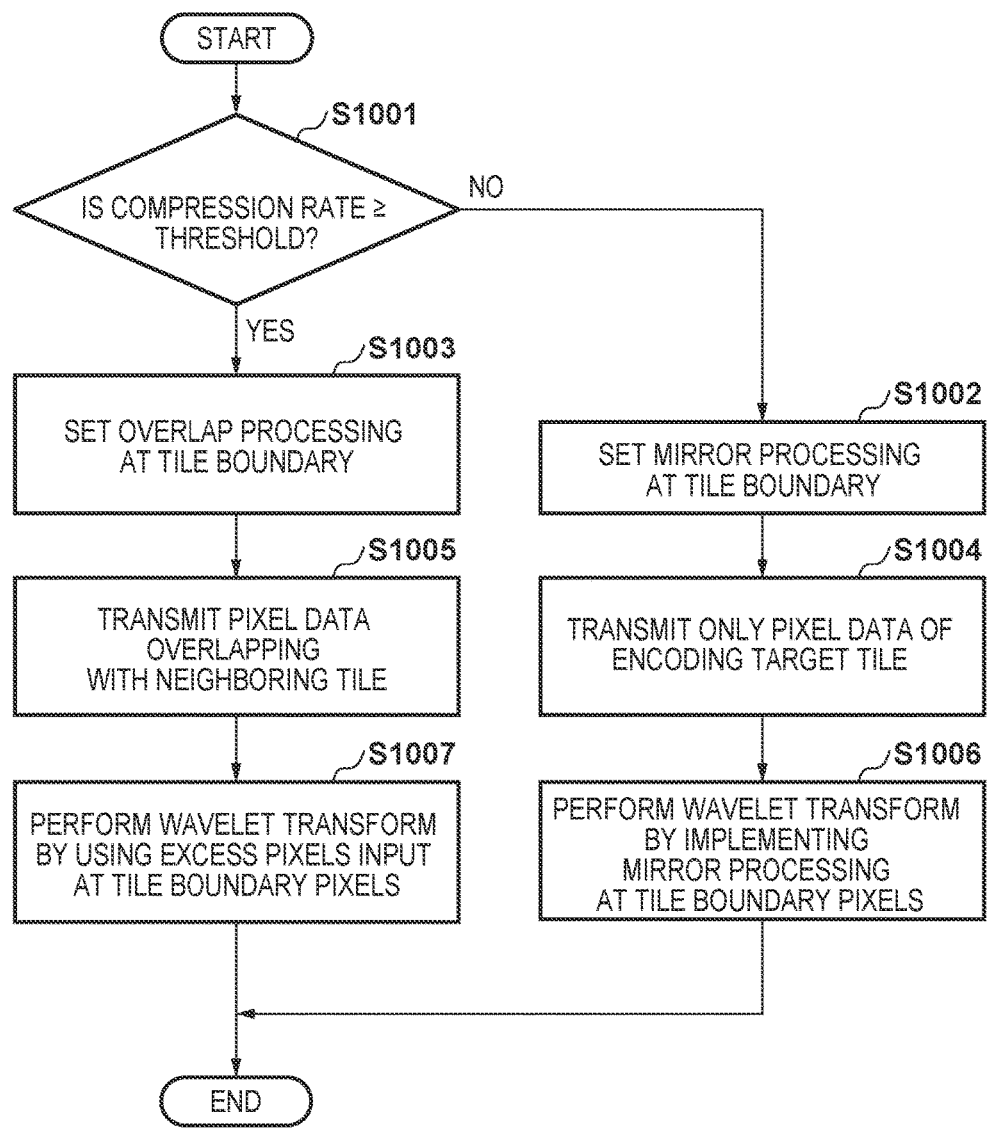
FIG. 9 is a flowchart illustrating a processing procedure for an encoding apparatus in the second embodiment.

FIG. 8 depicts a block configuration diagram of an image encoding unit 800 in a second embodiment. The image encoding unit 800 in the second embodiment differs in a point of providing a setting unit 801 instead of the setting unit 106 of FIG. 1 in the first embodiment, and a point of having an encoded data amount adjustment unit 802. In addition, operation of the data input controller 102 and the wavelet transform unit 103 also differs from that for FIG. 1. Note that, in addition to the function of the setting unit 106 of FIG. 1, the setting unit 801 in the second embodiment inputs a compression rate in accordance with an instruction from an operation unit (not shown), and in accordance with this controls the data input controller 102 and the encoded data amount adjustment unit 802. FIG. 9 is a flowchart illustrating a processing procedure in the second embodiment. Below, the processing of each configuration element of FIG. 8 is explained in accordance with the flowchart of FIG. 9.

If the input compression rate is smaller than a preset threshold, the setting unit 801 instructs the data input controller 102 so as to implement by mirror processing a wavelet transform at the tile boundary (step S1001, step S1002). Meanwhile, if the compression rate is greater than or equal to the threshold, it instructs the data input controller 102 so as to implement a wavelet transform at the tile boundary by overlapping up to pixels of the neighboring tile (step S1001, step S1003). A flag indicating by which method encoding was performed is stored in a header of an encoded stream (a flag indicating a determination result for larger/smaller between the compression rate and the threshold). Switching processing in accordance with the compression rate is according to a following reason.

If the compression rate is smaller than the threshold, because the quantization step is small even though the amount of encoded data becomes large, quantization error becomes small, and it becomes hard for image degradation to occur at the tile boundary. Consequently, even if mirror processing is selected, control is performed so as to prevent an increase of extra encoding target coefficients by the overlapping.

However, when the compression rate is large, it becomes impossible to ignore the quantization error, and image degradation at the tile boundary is noticeable. Therefore, similarly to the first embodiment, encoding processing that refers to the tile neighboring pixel data is executed. Note that adjustment of an actual amount of encoded data is performed by the encoded data amount adjustment unit 802, but detail is explained later.

In accordance with a wavelet transform processing method designated from the setting unit 801, the data input controller 102 divides the image data into tiles of a predetermined size, reads from the frame memory 101 the tiles in a predetermined order, and supplies them to the wavelet transform unit 103.

For example, if a method for implementing a wavelet transform of a tile boundary by mirror processing is selected, pixels of a neighboring tile are not inputted, and only pixels of an encoding target tile are inputted (step S1004). In contrast, if a method for implementing a wavelet transform by overlapping up to pixels of a neighboring tile is selected, the tile input method illustrated in the previously described first embodiment is implemented (step S1005). Note that, at that time, the wavelet transform processing method designated by the setting unit 801 is also transmitted to the wavelet transform unit 103.

The wavelet transform unit 103 executes the wavelet transform in accordance with the wavelet transform method transmitted from the data input controller 102. For example, if a method for implementing a wavelet transform of a tile boundary by mirror processing is selected, pixels of the tile boundary are generated by mirror processing, and a wavelet transform is performed (step S1006).

Meanwhile, if a method for executing the wavelet transform by overlapping up to pixels of a neighboring tile is selected, the wavelet transform unit 103 uses the tile image data of interest and the tile neighboring pixel data to execute the wavelet transform (step S1007). At this time, sifting of the transformation coefficient data to supply to the quantizing unit 104 is the same as in the first embodiment.

Next, processing of the encoded data amount adjustment unit 802 in the second embodiment is explained.

A target code amount for one frame image is determined by a compression rate. Accordingly, the target code amount is set to A_Target. It is assumed that the entropy encoding unit 105 performs entropy encoding of a bit plane configured at the same bit position of each piece of transformation coefficient data after quantization. The encoded data of the plane of a bit i is expressed as Ci, and the amount of encoded data therefor is expressed as A(Ci). At this point, a total amount of encoded data C_Total for one frame of encoded data generated by the entropy encoding unit 105 is as the following equation.

$$C\_Total = \Sigma A(Ci) \ (i=0, 1, \ldots, MSB)$$

Consequently, to set the amount of encoded data for the frame of interest to be less than or equal to a target code amount A_Target, a minimum value for k that satisfies the following equation is obtained.

$$C\_Total - \Sigma A(Ck) \leq A\_Target$$

If k is obtained, configuration may be taken to discard the encoded data for the bit plane from bit 0 until bit k.

Note that configuration may be taken, when decoding a stream that has been encoded by the second embodiment, to refer to a flag recorded in a stream header indicating which method has been selected. By referring to the flag, it is possible to determine whether the encoded data was obtained by implementing by overlapping the tile boundary until a coefficient of a neighboring tile, or was generated after performing mirror processing that folds back at the tile boundary.

As explained above, by the second embodiment, at a time of encoding processing of tile image data, whether to perform mirror processing or whether to refer to tile neighboring pixel data is selected in accordance with a compression rate. As a result, in particular if a high compression rate is set, it is possible to suppress the generation of noise at tile boundaries more than previously.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-211107, filed Oct. 27, 2015 and 2016-165074, filed Aug. 25, 2016 which are hereby incorporated by reference herein in their entirety.

What is claimed is:

1. An image encoding apparatus that divides image data into a plurality of tiles and performs encoding for each tile, the apparatus comprising:
    a transformation unit configured to perform, for each tile, a wavelet transform and obtain transformation coefficient data; and
    an encoding unit configured to encode, for each tile, the transformation coefficient data obtained by the transformation unit,
    wherein, if a neighboring tile that neighbors an encoding target tile is present,
    the transformation unit obtains the transformation coefficient data by performing the wavelet transform with reference to pixel data of the encoding target tile and a plurality of pieces of pixel data that neighbor the encoding target tile out of the neighboring tile, and
    the encoding unit, out of the transformation coefficient data obtained by referring to the plurality of pieces of pixel data of the neighboring tile, encodes at least transformation coefficient data necessary to decode the pixel data of the encoding target tile, and does not encode a portion of the transformation coefficient data obtained by the transformation unit.

2. The image encoding apparatus according to claim 1, wherein the encoding unit quantizes the transformation coefficient data obtained by the transformation unit, and encodes the coefficient data after the quantizing.

3. The image encoding apparatus according to claim 1, wherein
    the transformation unit performs a plurality of wavelet transforms and obtains transformation coefficient data having a plurality of subbands, and
    the encoding unit encodes, from the plurality of subbands, a subband for a low frequency component for which a decomposition level is uppermost, and a subband for a high-frequency component.

4. The image encoding apparatus according to claim 1, wherein the encoding unit, out of transformation coefficient data of the neighboring tile, encodes a number of pieces of the transformation coefficient data that neighbor a tile boundary with the tile of interest in accordance with a number of pixels in a vertical or horizontal direction of the encoding target tile.

5. The image encoding apparatus according to claim 1, wherein the encoding unit, out of transformation coefficient data of the neighboring tile, encodes a number of pieces of the transformation coefficient data that neighbor a tile boundary with the tile of interest in accordance with a number of wavelet transforms by the transformation unit.

6. The image encoding apparatus according to claim 1, wherein the encoding unit, out of the transformation coefficient data obtained by referring to the plurality of pieces of pixel data of the neighboring tile, encodes only transformation coefficient data necessary to decode the pixel data of the encoding target tile.

7. The image encoding apparatus according to claim 1, wherein the encoding unit, out of the transformation coefficient data obtained by referring to the plurality of pieces of pixel data of the neighboring tile, encodes predetermined transformation coefficient data that includes transformation coefficient data necessary to decode the pixel data of the encoding target tile.

8. The image encoding apparatus according to claim 1, wherein a number of pixels of the neighboring tile for which to perform the wavelet transform by the transformation unit along with the tile of interest is decided in accordance with a number of pixels in a horizontal or vertical direction of the tile of interest.

9. The image encoding apparatus according to claim 8, wherein the number of pixels of the neighboring tile for which to perform the wavelet transform by the transformation unit along with the tile of interest is decided in accordance with a remainder when the number of pixels in a horizontal or vertical direction of the tile of interest is divided by a predetermined number.

10. The image encoding apparatus according to claim 1, wherein transformation coefficient data in the neighboring tile to encode by the encoding unit is decided in accordance with a number of pixels in a horizontal or vertical direction of the tile of interest.

11. The image encoding apparatus according to claim 10, wherein the transformation coefficient data in the neighboring tile to encode by the encoding unit is decided in accordance with a remainder when the number of pixels in a horizontal or vertical direction of the tile of interest is divided by a predetermined number.

12. The image encoding apparatus according to claim 1, further comprising a setting unit configured to set a compression rate,
wherein the transformation unit,
if the compression rate set by the setting unit is smaller than a preset threshold, when performing a wavelet transform to the tile of interest, assumes that pixels in the tile of interest exist folded back outside of the tile of interest, performs a wavelet transform to obtain transformation coefficient data of a resolution level set by the setting unit, and supplies the transformation coefficient data generated from within the tile of interest to the quantization unit,
if the compression rate set by the setting unit is greater than or equal to the preset threshold,
to obtain the transformation coefficient data of the resolution level set by the setting unit, performs a wavelet transform that refers to pixel data of the tile of interest and a neighboring tile that neighbors the tile of interest, and
sets transformation coefficient data of each resolution level closest to a boundary between the tile of interest and the neighboring tile out of the transformation coefficient data obtained from the neighboring tile and the transformation coefficient data obtained from the tile of interest as quantization target transformation coefficient data that corresponds to the tile of interest, and supplies it to the quantization unit.

13. The image encoding apparatus according to claim 12, wherein information indicating a result of comparing the compression rate set by the setting unit and the threshold is stored in a header of an encoded stream and output.

14. The image encoding apparatus according to claim 12, wherein the transformation unit performs the wavelet transform by using a 5/3 tap filter, and out of the transformation coefficient data obtained from the neighboring tile, supplies high-frequency transformation coefficient data for each decomposition level to the quantization unit.

15. A method of controlling an image encoding apparatus that divides image data into a plurality of tiles and performs encoding for each tile, the method comprising:
performing a wavelet transform for each tile to obtain transformation coefficient data; and
encoding the transformation coefficient data for each tile,
wherein, if a neighboring tile that neighbors an encoding target tile is present,
in the transform, the transformation coefficient data is obtained by performing the wavelet transform with reference to pixel data of the encoding target tile and a plurality of pieces of pixel data that neighbor the encoding target tile out of the neighboring tile, and
the transformation coefficient data obtained by the transform includes transformation coefficient data not encoded by the encoding, and
in the encoding, out of the transformation coefficient data obtained by referring to the plurality of pieces of pixel data of the neighboring tile, transformation coefficient data necessary to decode the pixel data of the encoding target tile is encoded.

16. A non-transitory computer-readable storage medium storing a program causing a processor to execute steps of an image encoding method for dividing image data into a plurality of tiles and performing encoding for each tile, the method comprising:
performing a wavelet transform for each tile to obtain transformation coefficient data; and
encoding the transformation coefficient data for each tile,
wherein, if there is a neighboring tile that neighbors an encoding target tile,
in the transform, transformation coefficient data is obtained by performing the wavelet transform by referring to pixel data of the encoding target tile and a plurality of pieces of pixel data that neighbor the encoding target tile from the neighboring tile,
the transformation coefficient data obtained by the transform includes transformation coefficient data not encoded by the encoding, and
in the encoding, from the transformation coefficient data obtained by referring to the plurality of pieces of pixel data of the neighboring tile, transformation coefficient data necessary to decode pixel data of the encoding target tile is encoded.

* * * * *